(12) United States Patent
Lee et al.

(10) Patent No.: US 10,469,838 B2
(45) Date of Patent: Nov. 5, 2019

(54) METHOD AND APPARATUS FOR PROCESSING VIDEO SIGNAL USING GRAPH-BASED TRANSFORMATION BASED ON PREDICTION ANGLE

(71) Applicant: LG ELECTRONICS INC., Seoul (KR)

(72) Inventors: Bumshik Lee, Seoul (KR); Sehoon Yea, Seoul (KR); Moonmo Koo, Seoul (KR)

(73) Assignee: LG Electronics Inc., Seoul (KR)

( * ) Notice: Subject to any disclaimer, the term of this patent is extended or adjusted under 35 U.S.C. 154(b) by 43 days.

(21) Appl. No.: 15/758,920

(22) PCT Filed: Sep. 12, 2016

(86) PCT No.: PCT/KR2016/010249
§ 371 (c)(1),
(2) Date: Mar. 9, 2018

(87) PCT Pub. No.: WO2017/043941
PCT Pub. Date: Mar. 16, 2017

(65) Prior Publication Data
US 2018/0288407 A1 Oct. 4, 2018

Related U.S. Application Data

(60) Provisional application No. 62/217,007, filed on Sep. 10, 2015.

(51) Int. Cl.
*H04N 19/105* (2014.01)
*H04N 19/176* (2014.01)
(Continued)

(52) U.S. Cl.
CPC ......... *H04N 19/105* (2014.11); *H04N 19/107* (2014.11); *H04N 19/11* (2014.11);
(Continued)

(58) Field of Classification Search
CPC .... H04N 19/107; H04N 19/18; H04N 19/122; H04N 19/105; H04N 19/176;
(Continued)

(56) References Cited

U.S. PATENT DOCUMENTS 6,341,144 B1 * 1/2002 Haskell ............... H04N 19/105
375/240.11
9,544,596 B1 * 1/2017 Han ..................... H04N 19/105
(Continued)

FOREIGN PATENT DOCUMENTS

JP 201-4007477 A 1/2014
KR 10-2011-093532 A 8/2011
(Continued)

OTHER PUBLICATIONS

Eduardo Pavez, et al., GTT: "Graph Template Transforms with Applications to Image Coding", Picture Coding Symposium (PCS), Cairns Australia, Jun. 3, 2015, 7 pages.
(Continued)

*Primary Examiner* — Neil R Mikeska
(74) *Attorney, Agent, or Firm* — Fish & Richardson P.C.

(57) ABSTRACT

A method of encoding a video signal using a graph-based transformation includes: generating a residual block using a prediction block generated according to an intra prediction mode; obtaining at least one of a self-loop weight indicating a weight of boundary pixels in the residual block or a correlation coefficient indicating an inter-pixel correlation, on the basis of a prediction angle corresponding to the intra prediction mode; generating a graph on the basis of at least one of the self-loop weight or the correlation coefficient; determining a graph-based transformation kernel on the basis of the graph; and performing a transform for the residual block using the graph-based transformation kernel.

14 Claims, 27 Drawing Sheets

(51) Int. Cl.
| | |
|---|---|
| *H04N 19/61* | (2014.01) |
| *H04N 19/11* | (2014.01) |
| *H04N 19/182* | (2014.01) |
| *H04N 19/90* | (2014.01) |
| *H04N 19/107* | (2014.01) |
| *H04N 19/122* | (2014.01) |
| *H04N 19/18* | (2014.01) |
| *H04N 19/159* | (2014.01) |
| *H04N 19/134* | (2014.01) |
| *H04N 19/12* | (2014.01) |
| *H04N 19/463* | (2014.01) |
| *H04N 19/91* | (2014.01) |

(52) U.S. Cl.
CPC ........... *H04N 19/12* (2014.11); *H04N 19/122* (2014.11); *H04N 19/134* (2014.11); *H04N 19/159* (2014.11); *H04N 19/176* (2014.11); *H04N 19/18* (2014.11); *H04N 19/182* (2014.11); *H04N 19/463* (2014.11); *H04N 19/61* (2014.11); *H04N 19/90* (2014.11); *H04N 19/91* (2014.11)

(58) Field of Classification Search
CPC .... H04N 19/463; H04N 19/11; H04N 19/182; H04N 19/90; H04N 19/159; H04N 19/134; H04N 19/12; H04N 19/61; H04N 19/91

See application file for complete search history.

(56) References Cited

U.S. PATENT DOCUMENTS

| | | | |
|---|---|---|---|
| 9,565,451 B1* | 2/2017 | Mukherjee | H04N 19/176 |
| 2003/0138150 A1* | 7/2003 | Srinivasan | H04N 19/136 |
| | | | 382/238 |
| 2011/0206288 A1* | 8/2011 | Lee | H04N 19/597 |
| | | | 382/233 |
| 2012/0140821 A1* | 6/2012 | Drugeon | H04N 19/105 |
| | | | 375/240.12 |
| 2014/0064360 A1* | 3/2014 | Rapaka | H04N 19/105 |
| | | | 375/240.02 |
| 2014/0072041 A1* | 3/2014 | Seregin | H04N 19/105 |
| | | | 375/240.13 |
| 2015/0016516 A1* | 1/2015 | Saxena | H04N 19/105 |
| | | | 375/240.12 |
| 2015/0237380 A1* | 8/2015 | Sadafale | H04N 19/86 |
| | | | 375/240.02 |
| 2015/0245072 A1* | 8/2015 | Chen | H04N 19/593 |
| | | | 375/240.18 |
| 2017/0257579 A1* | 9/2017 | Said | G06T 9/00 |

FOREIGN PATENT DOCUMENTS

| | | |
|---|---|---|
| KR | 10-2015-046353 A | 4/2015 |
| WO | WO 2015/009039 A | 1/2015 |

OTHER PUBLICATIONS

International Search Report and Written Opinion dated Jan. 10, 2017, 12 pages.

* cited by examiner

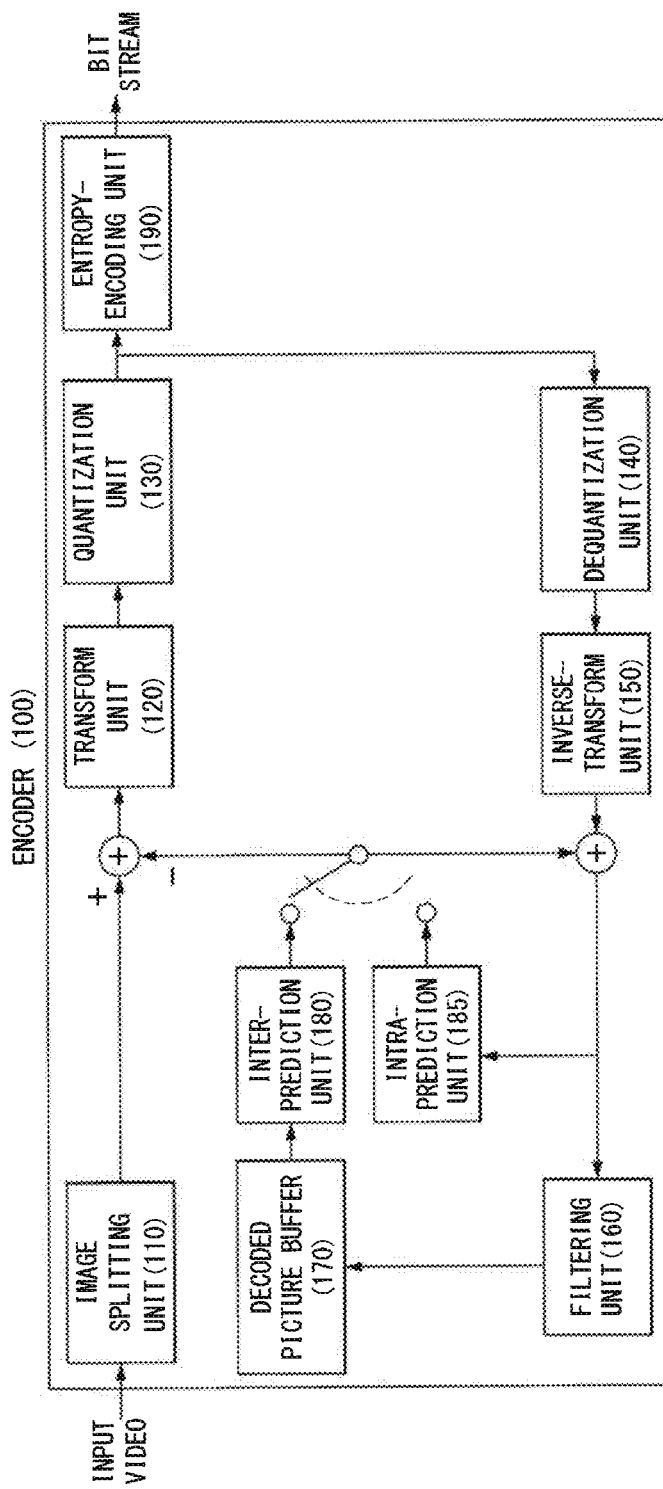
[FIG. 1]

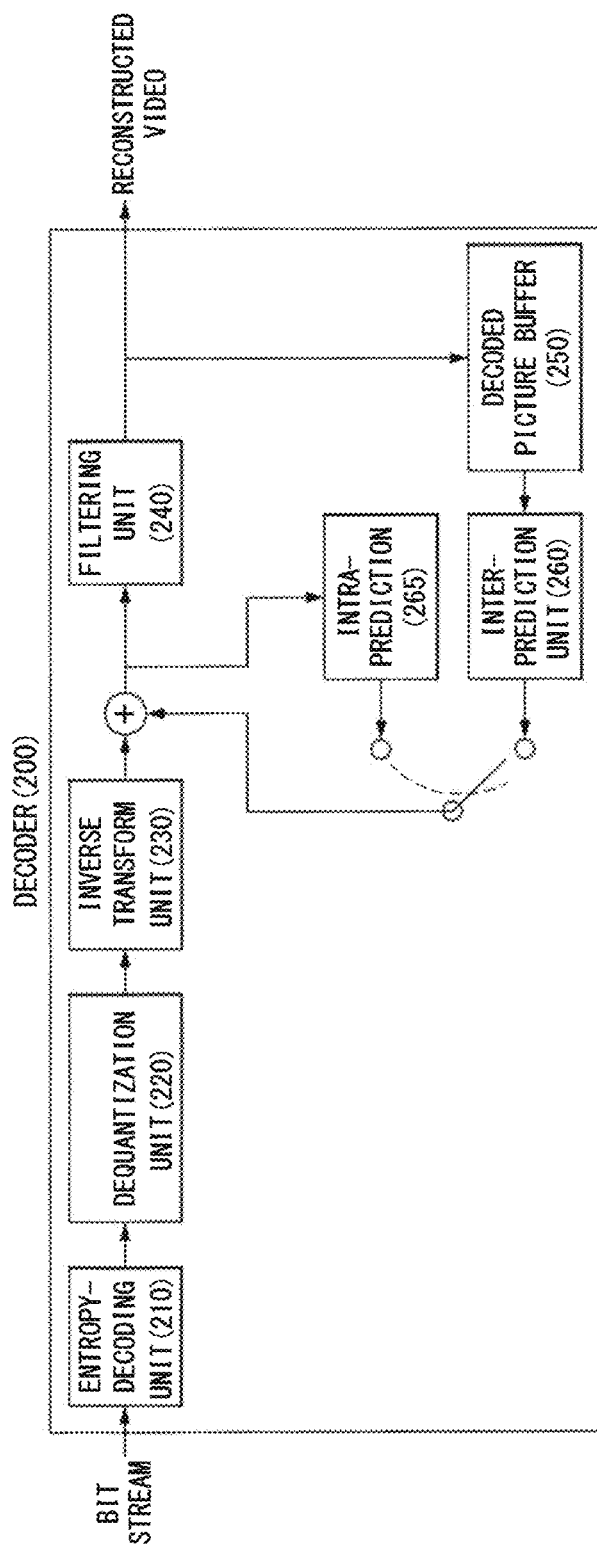
[FIG. 2]

[FIG. 3A]
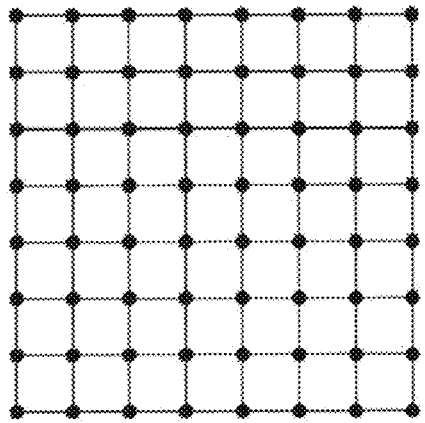
[FIG. 3B]
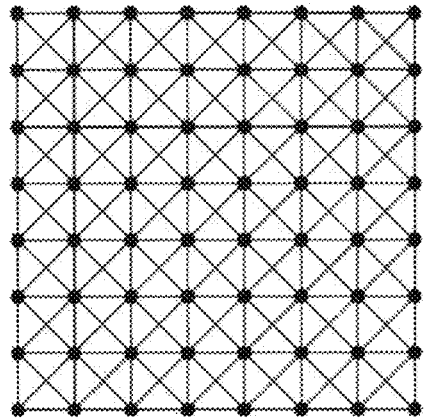

[FIG. 4A]
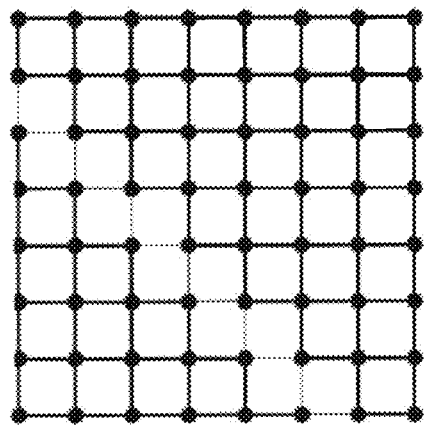
[FIG. 4B]
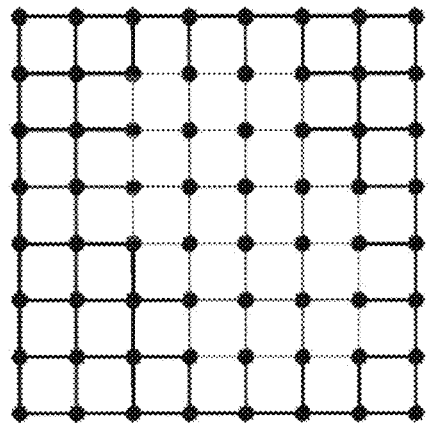

[FIG. 5A]
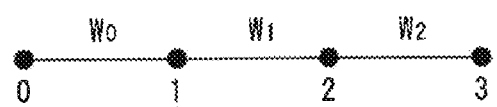
[FIG. 5B]
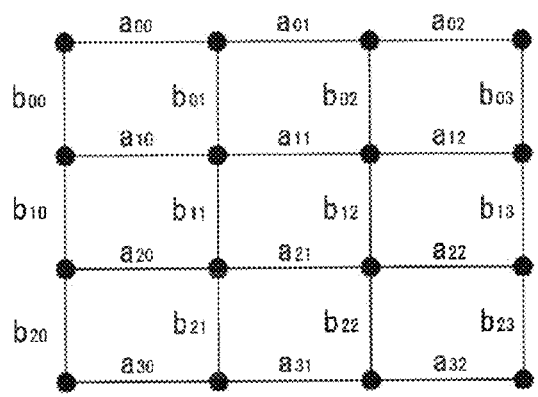

[FIG. 6A]
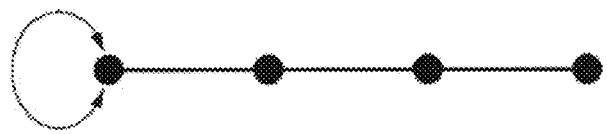
[FIG. 6B]
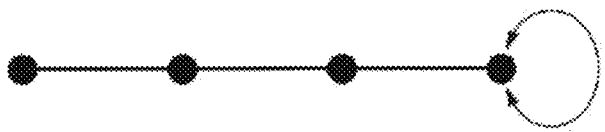
[FIG. 6C]
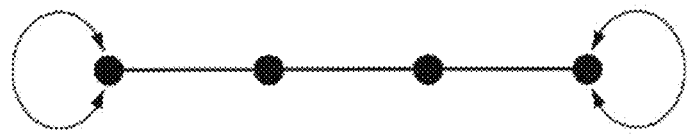
[FIG. 6D]
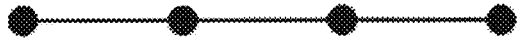

[FIG. 7]
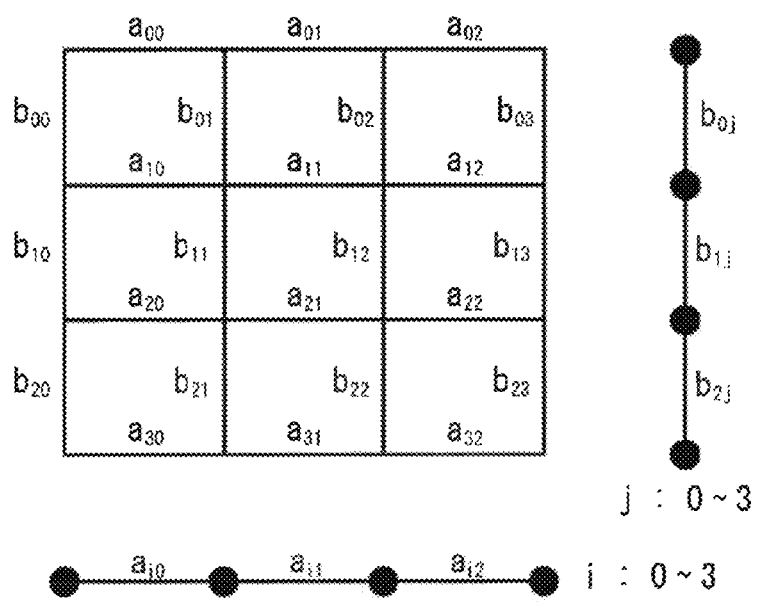

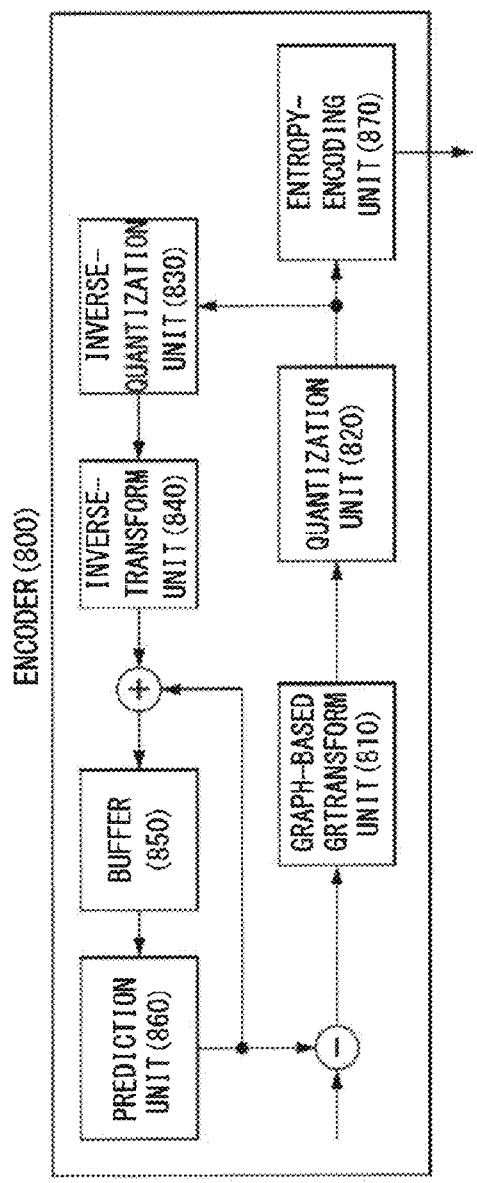
[FIG. 8]

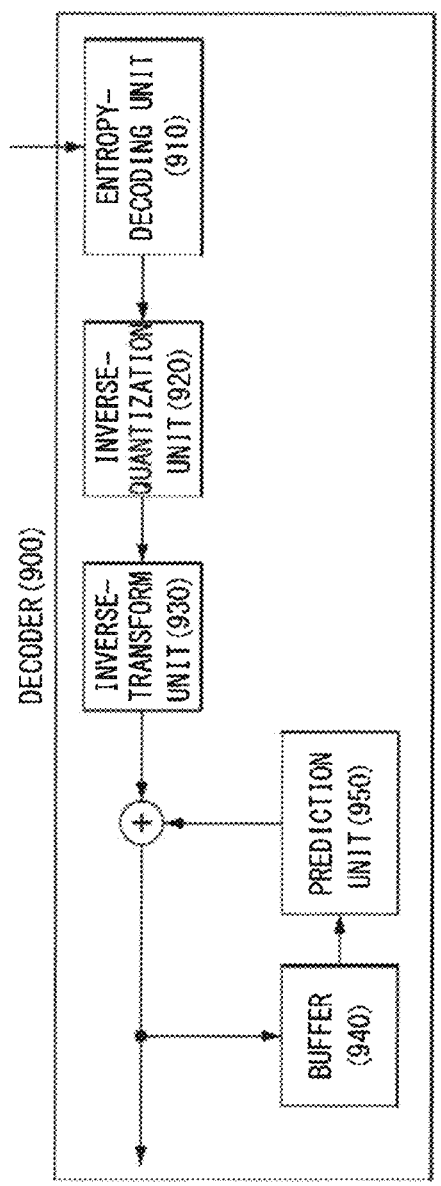
[FIG. 9]

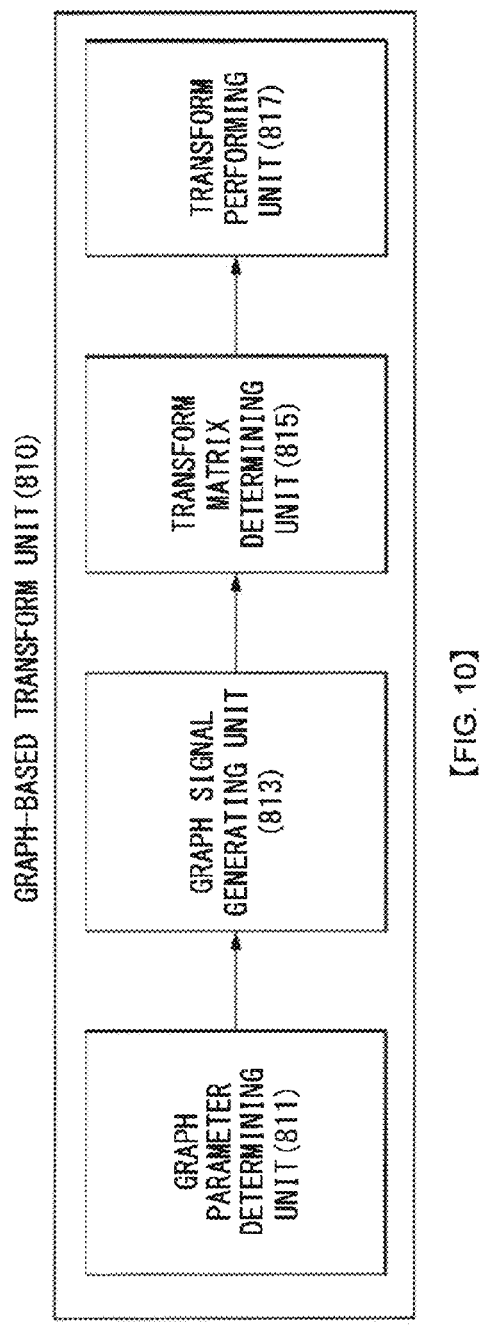
[FIG. 10]

[FIG. 11]
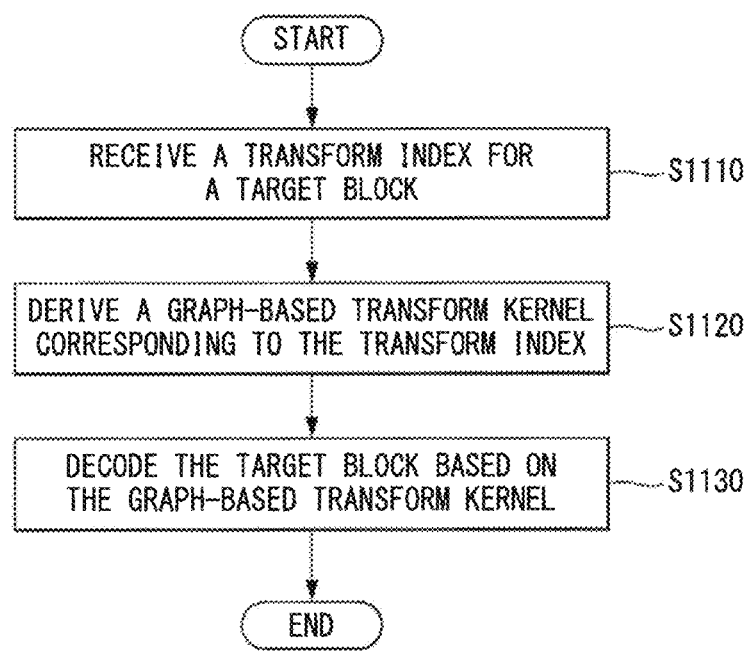

[FIG. 12]
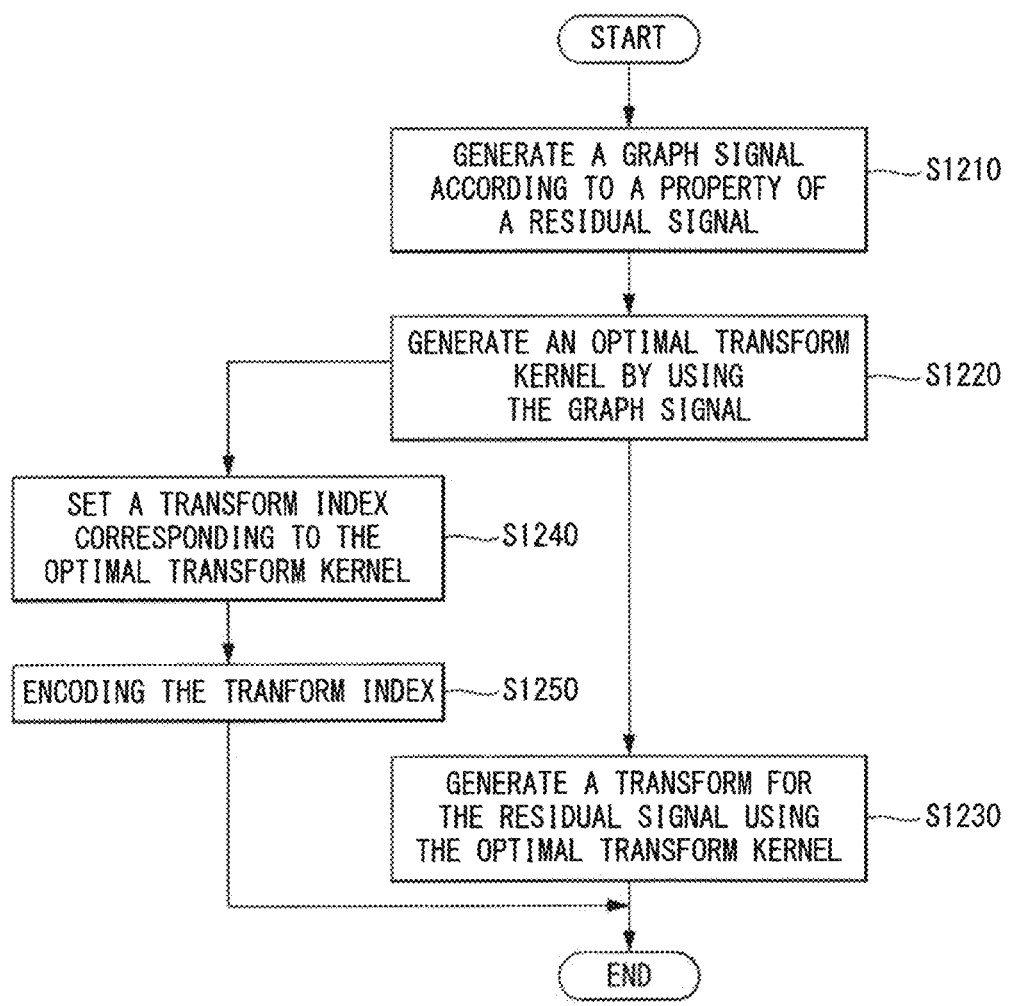

[FIG. 13]
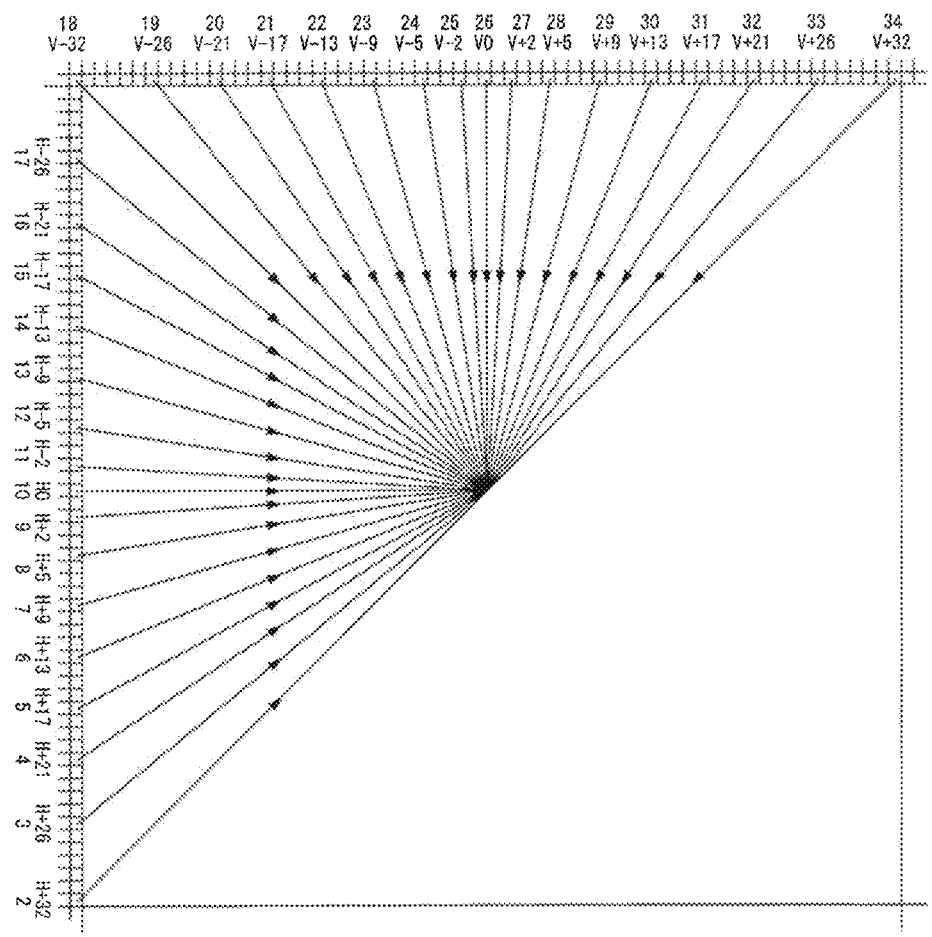

[FIG. 14]
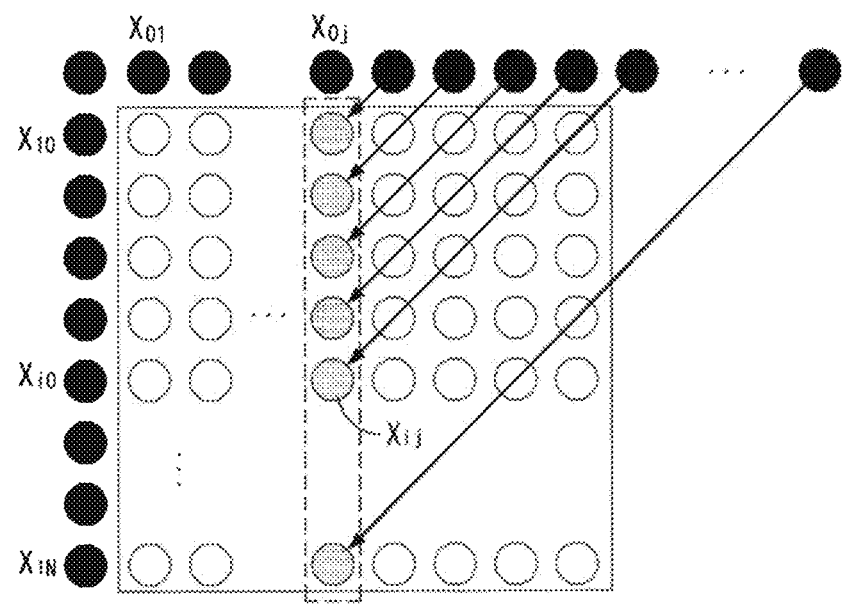

[FIG. 15]
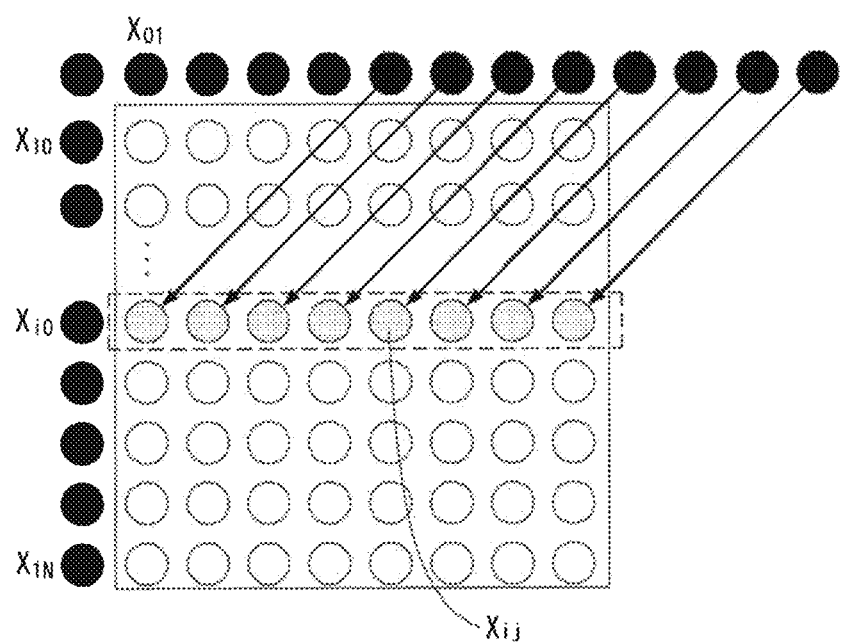

[FIG. 16]
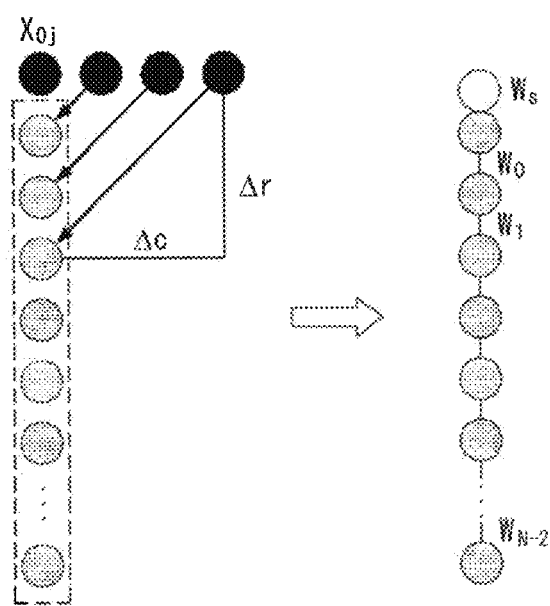

[FIG. 17]
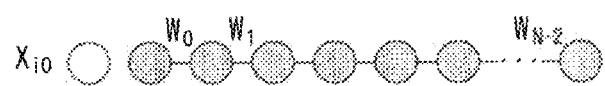

[FIG. 18]
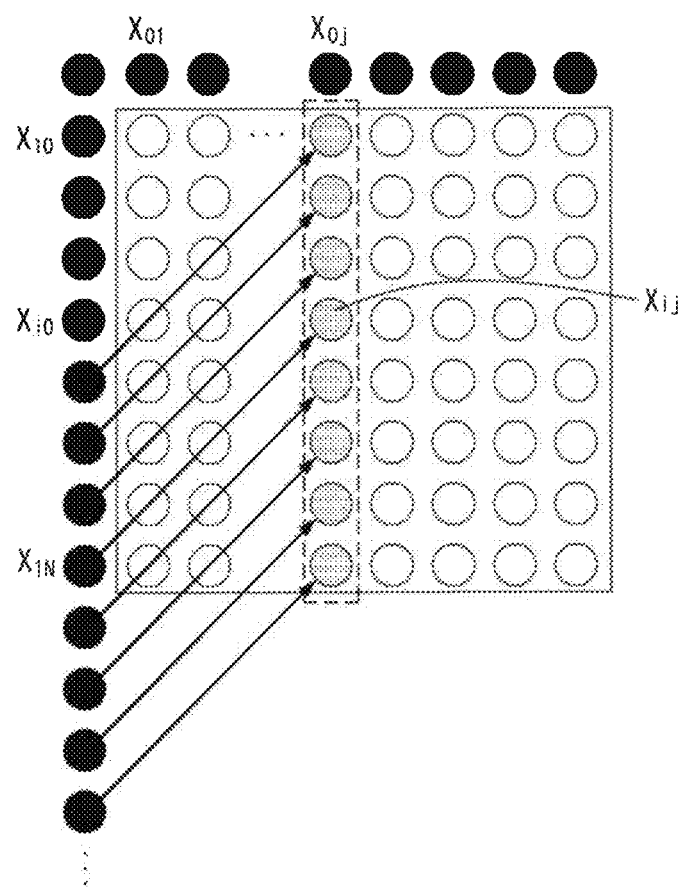

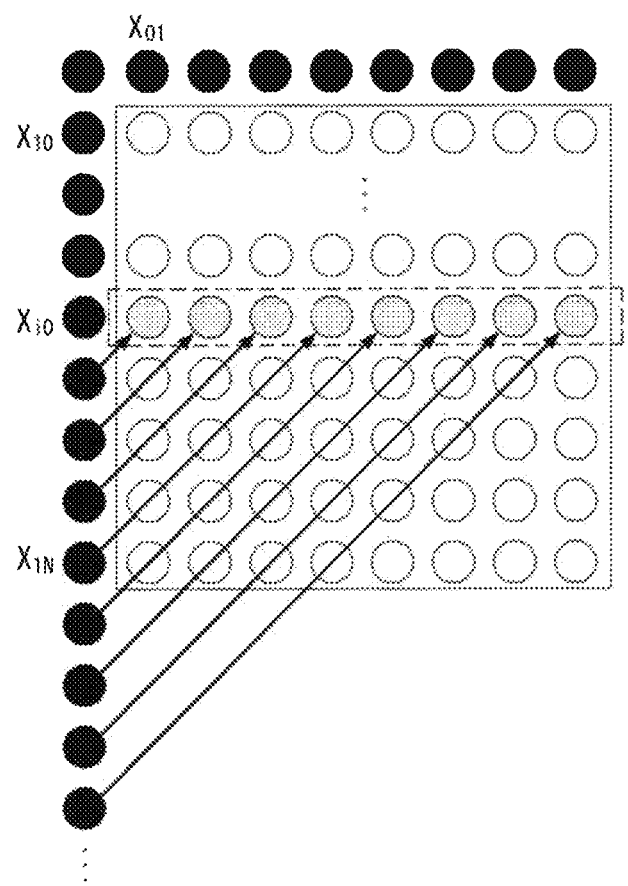
[FIG. 19]

[FIG. 20]
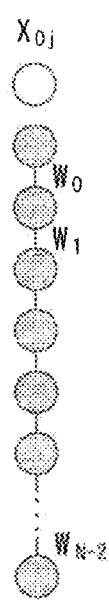

[FIG. 21]
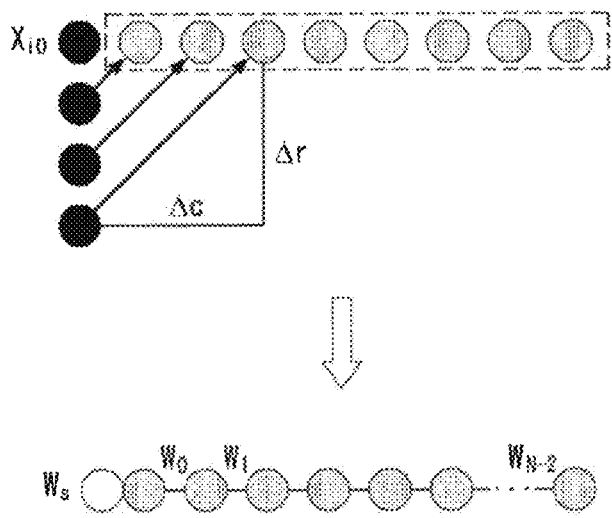

[FIG. 22]
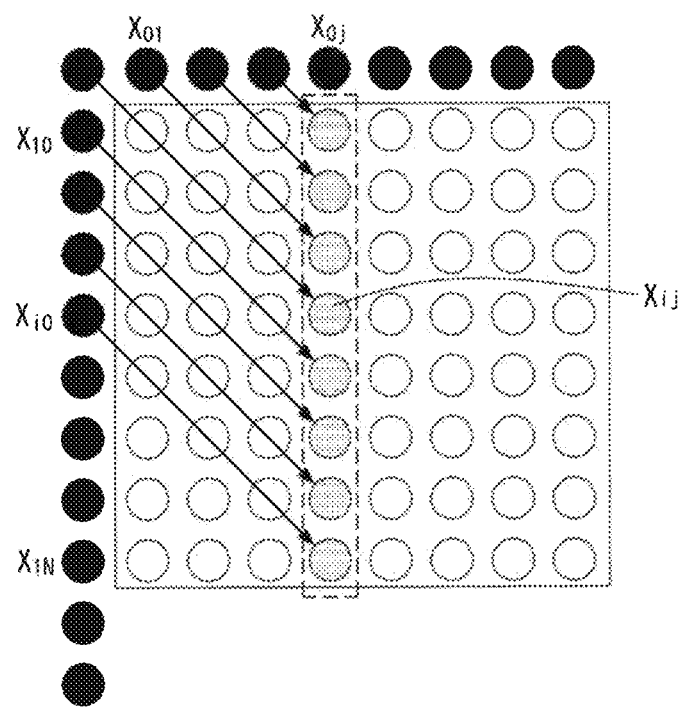

[FIG. 23]
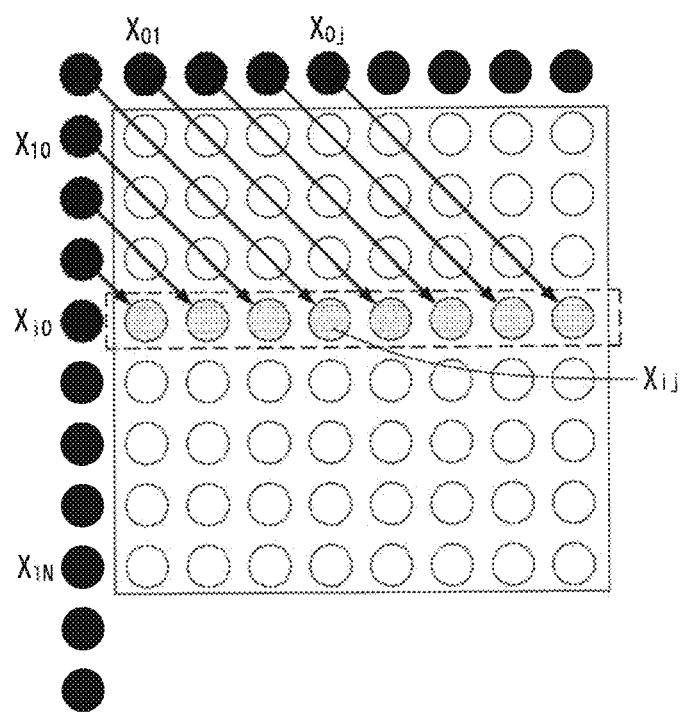

[FIG. 24]
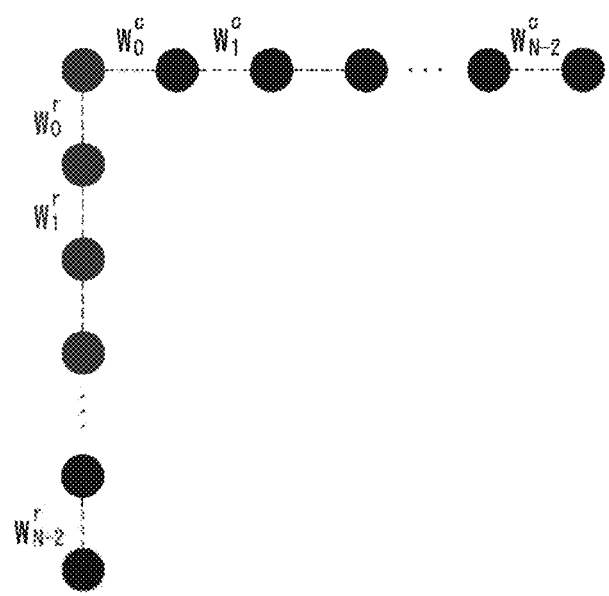

[FIG. 25]
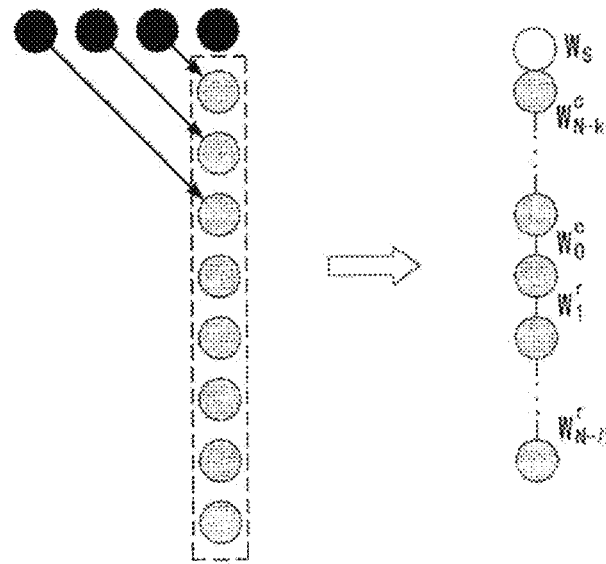

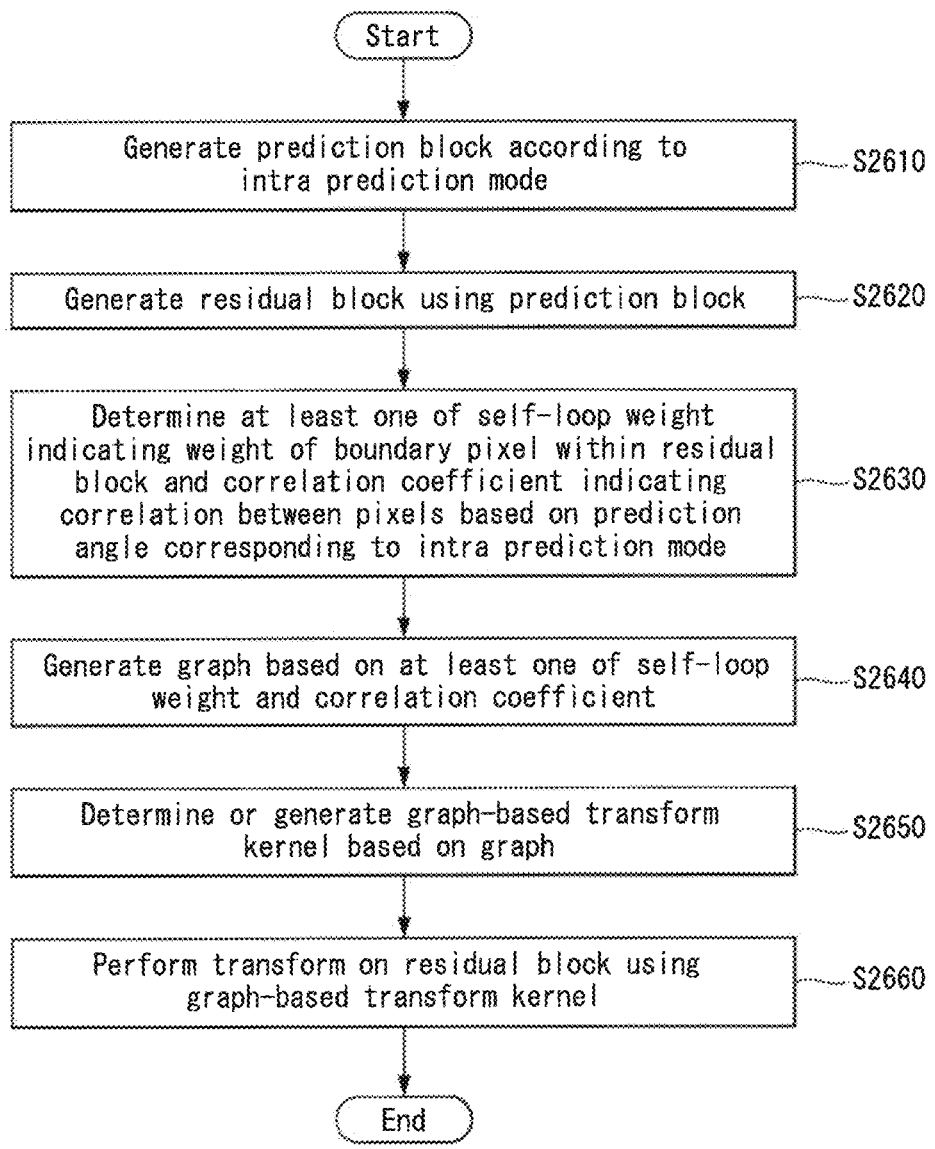
[FIG. 26]

[FIG. 27]
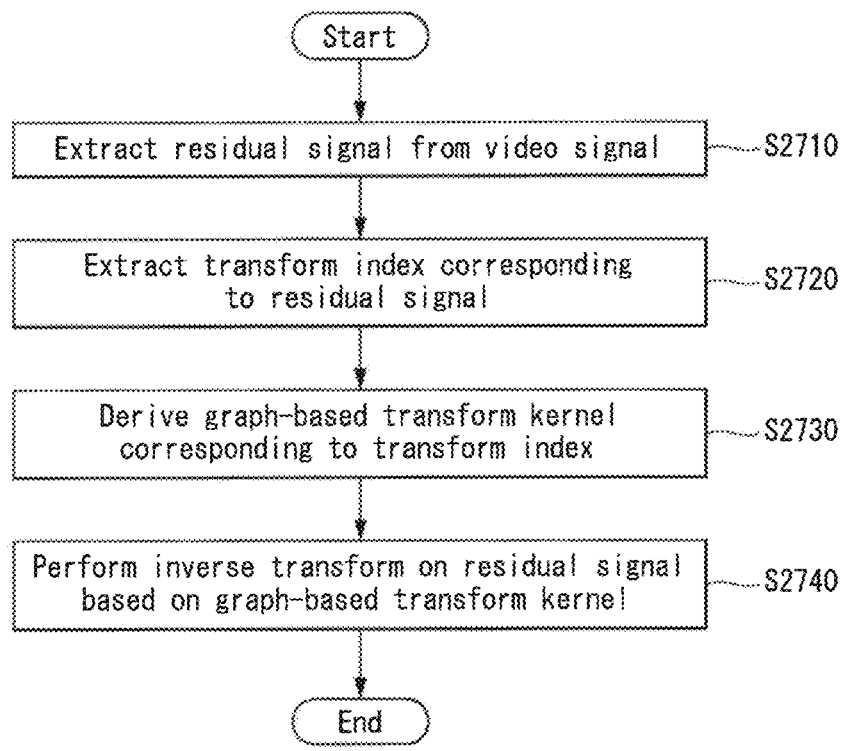

METHOD AND APPARATUS FOR PROCESSING VIDEO SIGNAL USING GRAPH-BASED TRANSFORMATION BASED ON PREDICTION ANGLE

CROSS-REFERENCE TO RELATED APPLICATIONS

This application is a National Stage filing under 35 U.S.C. 371 of International Application No. PCT/KR2016/010249, filed on Sep. 12, 2016, which claims the benefit of U.S. Provisional Application No. 62/217,007, filed on Sep. 10, 2015, the contents of which are all hereby incorporated by reference herein in their entirety.

TECHNICAL FIELD

The present invention relates to a method and apparatus for encoding/decoding a video signal using graph-based transform. Specifically, the present invention relates to a method of generating a separable graph-based transform kernel according to a prediction angle and encoding/decoding a video signal using the graph-based transform kernel.

BACKGROUND ART

A graph is a data expression form advantageous for describing inter-pixel relation information, and a graph-based signal processing scheme of processing inter-pixel relation information by expressing it as a graph has been utilized. In the graph-based signal processing, concepts such as sampling, filtering, conversion, and the like, may be generalized using a graph in which each signal sample indicates a vertex and relations of signals are indicated as graph edges having a positive weight.

In such graph-based signal processing, residual signals may have quite different statistical characteristics depending on prediction methods. Accordingly, it is necessary to improve compression efficiency using an optimum transform kernel into which a characteristic according to a prediction method has been incorporated.

DISCLOSURE

Technical Problem

The present invention is to provide a method of generating a transform kernel according to a prediction angle and processing a signal using the transform kernel.

The present invention is to provide a method of generating a graph in a row and column direction with respect to an intra prediction mode and deriving a separable graph-based transform kernel.

The present invention is to provide a method of determining a correlation coefficient or weight value indicating a correlation between pixels when generating a graph.

Technical Solution

The present invention provides a method of applying a graph-based transform adaptive to the characteristics of a video signal or a residual signal.

The present invention provides a method of generating an optimum transform kernel based on the graph characteristics of a residual block.

The present invention provides a method of generating a transform kernel according to a prediction angle and processing a signal using the transform kernel.

The present invention provides a method of generating a graph in a row and column direction with respect to an intra prediction mode and deriving a separable graph-based transform kernel.

The present invention provides a method of determining a correlation coefficient or weight value indicating a correlation between pixels when generating a graph.

The present invention provides a method of defining a transform index corresponding to an optimum transform kernel.

Advantageous Effects

The present invention can perform efficient coding by providing a method of generating a transform kernel according to a prediction angle and processing a signal using the transform kernel. Furthermore, more adaptive transform kernel can be generated by providing a method of determining a correlation coefficient or weight value indicating a correlation between pixels when generating a graph.

According to the present invention, a flexibility in which a transform can be adaptively applied may be secured, an operation complexity may be decreased, a faster adaptation is available for statistical property which is changed in different video segments with each other, and variability may be provided in performing a transform.

In addition, according to the present invention, more efficient coding may be performed by providing a method for applying an adaptive graph-based transform to a property of a video signal or a residual signal.

In addition, according to the present invention, an overhead in a transform matrix transmission and a transform selection may be significantly decreased by defining a transform index corresponding to an optimal transform kernel.

DESCRIPTION OF DRAWINGS

FIG. 1 shows a schematic block diagram of an encoder for encoding a video signal, in accordance with one embodiment of the present invention, FIG. 2 shows a schematic block diagram of a decoder for decoding a video signal, in accordance with one embodiment of the present invention.

FIGS. 3A and 3B show examples of graphs used for modeling statistical relationships in 8×8 block within a video frame according to an embodiment to which the present invention is applied.

FIGS. 4A and 4B show graphs of two shapes representing weights distribution as an embodiment to which the present invention is applied.

FIGS. 5A and 5B are diagrams for describing a procedure of obtaining a graph-based transform matrix based on 1-dimensional graph and 2-dimensional graph as an embodiment to which the present invention is applied.

FIGS. 6A-6D are views illustrating 1-dimensional graphs which may become transform bases for applying a separable transform according to an embodiment to which the present invention is applied.

FIG. 7 is a view illustrating a method for applying a different separable transform to each line of a 2-dimension graph according to an embodiment to which the present invention is applied.

FIG. 8 is a schematic block diagram of an encoder which processes a graph-based signal according to an embodiment to which the present invention is applied.

FIG. 9 is a schematic block diagram of a decoder which processes a graph-based signal according to an embodiment to which the present invention is applied.

FIG. 10 is an internal block diagram of a graph-based transform unit according to an embodiment to which the present invention is applied.

FIG. 11 is a flowchart for describing a method for deriving a graph-based transform kernel using a transform index as an embodiment to which the present invention is applied.

FIG. 12 is a flowchart for describing a method for generating an optimal transform kernel according to a property of a video signal or a residual signal as an embodiment to which the present invention is applied.

FIG. 13 is an embodiment to which the present invention is applied and is a diagram for illustrating prediction directions according to intra prediction modes.

FIGS. 14 and 15 are embodiments to which the present invention is applied and are diagram for illustrating a method of predicting a j-th column and an i-th row using at least one of a top boundary pixel and a right-up boundary pixel.

FIG. 16 is an embodiment to which the present invention is applied and shows a 1D graph for a j-th column predicted using at least one of a top boundary pixel and a right-up boundary pixel.

FIG. 16 is an embodiment to which the present invention is applied and shows a 1D graph for a j-th column predicted using at least one of a top boundary pixel and a right-up boundary pixel.

FIG. 17 is an embodiment to which the present invention is applied and shows 1D graph for an i-th row predicted using at least one of a top boundary pixel and a right-up boundary pixel.

FIGS. 18 and 19 are embodiments to which the present invention is applied and are diagrams for illustrating a method of predicting a j-th column and an i-th row using at least one of a left boundary pixel and a left-bottom boundary pixel.

FIG. 20 is an embodiment to which the present invention is applied and shows a 1D graph for a j-th column predicted using at least one of a left boundary pixel and a left-bottom boundary pixel.

FIG. 21 is an embodiment to which the present invention is applied and shows a 1D graph for an i-th row predicted using at least one of a left boundary pixel and a left-bottom boundary pixel.

FIGS. 22 and 23 are embodiments to which the present invention is applied and are diagrams for illustrating a method of predicting a j-th column and an i-th row using at least one of a left boundary pixel, a top boundary pixel, and a left-up corner pixel.

FIG. 24 is an embodiment to which the present invention is applied and shows the correlation coefficients of reference pixels if prediction is performed using at least one of a left boundary pixel, a top boundary pixel, and a left-up corner pixel.

FIG. 25 is an embodiment to which the present invention is applied and shows a 1D graph for a j-th column predicted using at least one of a left boundary pixel, a top boundary pixel, and a left-up corner pixel.

FIG. 26 is an embodiment to which the present invention is applied and shows a flowchart of generating a graph-based transform kernel based on a prediction angle according to an intra prediction mode.

FIG. 27 is an embodiment to which the present invention is applied and shows a flowchart of performing an inverse transform on a graph-based transform kernel generated based on a prediction angle according to an intra prediction mode.

BEST MODE

The present invention provides a method of encoding a video signal using a graph-based transform, including the steps of generating a residual block using a prediction block generated according to an intra prediction mode; obtaining at least one of a self-loop weight indicating a weight of a boundary pixel within the residual block or a correlation coefficient indicating a correlation between pixels, based on a prediction angle corresponding to the intra prediction mode; generating a graph based on at least one of the self-loop weight or the correlation coefficient; determining a graph-based transform kernel based on the graph; and performing a transform for the residual block using the graph-based transform kernel.

Furthermore, in the present invention, at least one of the self-loop weight or the correlation coefficient is determined for each row and each column of the residual block, and the graph is generated for each row and each column of the residual block.

Furthermore, in the present invention, the self-loop weight has a different value according to at least one of the intra prediction mode, the prediction angle, or the position of a reference pixel.

Furthermore, in the present invention, the self-loop weight is determined based on a distance between a first boundary pixel of each row and each column of the residual block and a reference pixel.

Furthermore, in the present invention, the self-loop weight is adjusted to have a value within a specific range by an adjustment parameter.

Furthermore, in the present invention, the method further includes the step of encoding a transform index corresponding to the graph-based transform kernel.

Furthermore, the present invention provides a method of decoding a video signal using a graph-based transform, including the steps of extracting a residual signal from the video signal; extracting a transform index corresponding to the residual signal; deriving a graph-based transform kernel corresponding to the transform index, wherein the graph-based transform kernel has been determined based on a graph expressed by at least one of a self-loop weight or a correlation coefficient and the at least one of the self-loop weight or the correlation coefficient has been determined based on a prediction angle corresponding to an intra prediction mode; and performing an inverse transform on the residual signal based on the graph-based transform kernel.

Furthermore, the present invention provides an apparatus for encoding a video signal using a graph-based transform, including a subtraction unit configured to generate a residual block using a prediction block generated according to an intra prediction mode; a graph generation unit configured to obtain at least one of a self-loop weight indicating a weight of a boundary pixel within the residual block or a correlation coefficient indicating a correlation between pixels, based on a prediction angle corresponding to the intra prediction mode and generating a graph based on at least one of the self-loop weight or the correlation coefficient; a transform matrix determination unit configured to determine a graph-based transform kernel based on the graph; and a transform execution unit configured to perform a transform for the residual block using the graph-based transform kernel.

Furthermore, the present invention provides an apparatus for decoding a video signal using a graph-based transform, including a parsing unit configured to extract a residual signal from the video signal and extracting a transform index corresponding to the residual signal and an inverse transform unit configured to derive a graph-based transform kernel corresponding to the transform index and performing an inverse transform on the residual signal based on the graph-based transform kernel, wherein the graph-based transform kernel has been determined based on a graph expressed by at least one of a self-loop weight or a correlation coefficient, and wherein the at least one of the self-loop weight or the correlation coefficient has been determined based on a prediction angle corresponding to an intra prediction mode.

MODE FOR INVENTION

Hereinafter, exemplary elements and operations in accordance with embodiments of the present invention are described with reference to the accompanying drawings, however, it is to be noted that the elements and operations of the present invention described with reference to the drawings are provided as only embodiments and the technical spirit and kernel configuration and operation of the present invention are not limited thereto.

Furthermore, terms used in this specification are common terms that are Furthermore, terms used in this specification are common terms that are now widely used, but in special cases, terms randomly selected by the applicant are used. In such a case, the meaning of a corresponding term is clearly described in the detailed description of a corresponding part. Accordingly, it is to be noted that the present invention should not be construed as being based on only the name of a term used in a corresponding description of this specification and that the present invention should be construed by checking even the meaning of a corresponding term.

Furthermore, terms used in this specification are common terms selected to describe the invention, but may be replaced with other terms for more appropriate analysis if such terms having similar meanings are present. For example, a signal, data, a sample, a picture, a frame, and a block may be properly replaced and interpreted in each coding process. Furthermore, partitioning, decomposition, splitting, division may also be properly replaced and interpreted in each coding process.

By applying a linear transform that adaptively modifies the statistical properties of a signal in different parts of a video sequence, compression efficiency may be improved. General statistical methods have been tried such an object, but they bring a restricted result. The present invention introduces a graph-based signal processing technique as a more efficient method for modeling statistical properties of a video signal for video compression.

In order to simplify mathematical analysis and to use the result known from a graph theory, most of applications developed for the graph-based signal processing uses an undirected graph without self-loop (i.e., there is no edge that connects nodes in itself), and models with non-negative edge only in each graph edge.

Such an approach may be successfully applied for signaling an image of well-defined discontinuity, sharp edge or a depth image. The graphs corresponding to $N^2$ pixel blocks in an image and video application require transmission overhead for $2N^2$ or $4N^2$ non-negative edge weights, generally. After a graph is defined, the orthogonal transform for coding or prediction may be derived by calculating spectral decomposition of a graph Laplacian matrix. For example, through the spectral decomposition, an eigenvector and an eigen value may be obtained.

The present invention provides a new method for modifying the procedure of calculating a graph-based transform using new generalization of the conventional spectral decomposition. Here, the transform obtained from a graph signal may be defined as Graph-Based Transform (hereinafter, GBT). For example, when the relation information between pixels constructing a TU is represented in a graph, the transform obtained from the graph may be referred to as GBT.

The general form of the spectral decomposition to which the present invention is applied may be obtained based on an additional set of graph edge parameters that have desired properties and graph vertex parameters. Through such an embodiment of the present invention, the transform properties may be well controlled, and the problem of sharp discontinuities of the vectors defining transform may be avoided. Hereinafter, the embodiments to which the present invention will be described in detail.

FIG. 1 shows a schematic block diagram of an encoder for encoding a video signal, in accordance with one embodiment of the present invention.

Referring to FIG. 1, an encoder 100 may include an image segmentation unit 110, a transform unit 120, a quantization unit 130, an inverse quantization unit 140, an inverse transform unit 150, a filtering unit 160, a DPB (Decoded Picture Buffer) 170, an inter-prediction unit 180, an intra-prediction unit 185 and an entropy-encoding unit 190.

The image segmentation unit 110 may divide an input image (or, a picture, a frame) input to the encoder 100 into one or more process units. For example, the process unit may be a coding tree unit (CTU), a coding unit (CU), a prediction unit (PU), or a transform unit (TU).

However, the terms are used only for convenience of illustration of the present disclosure. The present invention is not limited to the definitions of the terms. In this specification, for convenience of illustration, the term "coding unit" is employed as a unit used in a process of encoding or decoding a video signal. However, the present invention is not limited thereto. Another process unit may be appropriately selected based on contents of the present disclosure.

The encoder 100 may generate a residual signal by subtracting a prediction signal output from the inter-prediction unit 180 or intra prediction unit 185 from the input image signal. The generated residual signal may be transmitted to the transform unit 120.

The transform unit 120 may apply a transform technique to the residual signal to produce a transform coefficient. The transform process may be applied to a pixel block having the same size of a square, or to a block of a variable size other than a square.

The quantization unit 130 may quantize the transform coefficient and transmits the quantized coefficient to the entropy-encoding unit 190. The entropy-encoding unit 190 may entropy-code the quantized signal and then output the entropy-coded signal as bit streams.

The quantized signal output from the quantization unit 130 may be used to generate a prediction signal. For example, the quantized signal may be subjected to an inverse quantization and an inverse transform via the inverse quantization unit 140 and the inverse transform unit 150 in the loop respectively to reconstruct a residual signal. The reconstructed residual signal may be added to the prediction signal output from the inter-prediction unit 180 or intra-prediction unit 185 to generate a reconstructed signal.

On the other hand, in the compression process, adjacent blocks may be quantized by different quantization parameters, so that deterioration of the block boundary may occur. This phenomenon is called blocking artifacts. This is one of important factors for evaluating image quality. A filtering process may be performed to reduce such deterioration. Using the filtering process, the blocking deterioration may be eliminated, and, at the same time, an error of a current picture may be reduced, thereby improving the image quality.

The filtering unit 160 may apply filtering to the reconstructed signal and then outputs the filtered reconstructed signal to a reproducing device or the decoded picture buffer 170. The filtered signal transmitted to the decoded picture buffer 170 may be used as a reference picture in the inter-prediction unit 180. In this way, using the filtered picture as the reference picture in the inter-picture prediction mode, not only the picture quality but also the coding efficiency may be improved.

The decoded picture buffer 170 may store the filtered picture for use as the reference picture in the inter-prediction unit 180.

The inter-prediction unit 180 may perform temporal prediction and/or spatial prediction with reference to the reconstructed picture to remove temporal redundancy and/or spatial redundancy. In this case, the reference picture used for the prediction may be a transformed signal obtained via the quantization and inverse quantization on a block basis in the previous encoding/decoding. Thus, this may result in blocking artifacts or ringing artifacts.

Accordingly, in order to solve the performance degradation due to the discontinuity or quantization of the signal, the inter-prediction unit 180 may interpolate signals between pixels on a subpixel basis using a low-pass filter. In this case, the subpixel may mean a virtual pixel generated by applying an interpolation filter. An integer pixel means an actual pixel existing in the reconstructed picture. The interpolation method may include linear interpolation, bi-linear interpolation and Wiener filter, etc.

The interpolation filter may be applied to the reconstructed picture to improve the accuracy of the prediction. For example, the inter-prediction unit 180 may apply the interpolation filter to integer pixels to generate interpolated pixels. The inter-prediction unit 180 may perform prediction using an interpolated block composed of the interpolated pixels as a prediction block.

The intra-prediction unit 185 may predict a current block by referring to samples in the vicinity of a block to be encoded currently. The intra-prediction unit 185 may perform a following procedure to perform intra prediction. First, the intra-prediction unit 185 may prepare reference samples needed to generate a prediction signal. Then, the intra-prediction unit 185 may generate the prediction signal using the prepared reference samples. Thereafter, the intra-prediction unit 185 may encode a prediction mode. At this time, reference samples may be prepared through reference sample padding and/or reference sample filtering. Since the reference samples have undergone the prediction and reconstruction process, a quantization error may exist. Therefore, in order to reduce such errors, a reference sample filtering process may be performed for each prediction mode used for intra-prediction The prediction signal generated via the inter-prediction unit 180 or the intra-prediction unit 185 may be used to generate the reconstructed signal or used to generate the residual signal.

FIG. 2 shows a schematic block diagram of a decoder for decoding a video signal, in accordance with one embodiment of the present invention.

Referring to FIG. 2, a decoder 200 may include a parsing unit (not shown), an entropy-decoding unit 210, an inverse quantization unit 220, an inverse transform unit 230, a filtering unit 240, a decoded picture buffer (DPB) 250, an inter-prediction unit 260 and an intra-prediction unit 265.

A reconstructed video signal output from the decoder 200 may be reproduced using a reproducing device.

The decoder 200 may receive the signal output from the encoder as shown in FIG. 1. The received signal may be entropy-decoded via the entropy-decoding unit 210.

The inverse quantization unit 220 may obtain a transform coefficient from the entropy-decoded signal using quantization step size information. In this case, the obtained transform coefficient may be associated with the operations of the transform unit 120 as described above with reference to FIG. 1.

The inverse transform unit 230 may inverse-transform the transform coefficient to obtain a residual signal.

A reconstructed signal may be generated by adding the obtained residual signal to the prediction signal output from the inter-prediction unit 260 or the intra-prediction unit 265.

The filtering unit 240 may apply filtering to the reconstructed signal and may output the filtered reconstructed signal to the reproducing device or the decoded picture buffer unit 250. The filtered signal transmitted to the decoded picture buffer unit 250 may be used as a reference picture in the inter-prediction unit 260.

Herein, detailed descriptions for the filtering unit 160, the inter-prediction unit 180 and the intra-prediction unit 185 of the encoder 100 may be equally applied to the filtering unit 240, the inter-prediction unit 260 and the intra-prediction unit 265 of the decoder 200 respectively.

FIGS. 3A and 3B show examples of graphs used for modeling statistical relationships in 8×8 block within a video frame according to an embodiment to which the present invention is applied.

The discrete-time signal processing technique has been developed from directly processing and filtering an analogue signal, and accordingly, has been restricted by a few common assumptions such as sampling and processing regularly organized data only.

Basically, the video compression field is based on the same assumption, but has been generalized for a multi-dimensional signal. The signal processing based on a graph representation generalizes the concepts such as sampling, filtering and Fourier transform, uses the graph that represents a vertex by each signal sample, and is started from the conventional approach in which signal relationships are represented by graph edges with positive weights. This completely isolates a signal from its acquisition process, and accordingly, the properties such as sampling rate and sequence are completely replaced by the properties of a graph. Accordingly, the graph representation may be defined by a few specific graph models.

In the present invention, an undirected simple graph and an undirected edge may be used to represent an empirical connection between data values. Here, the undirected simple graph may mean a graph without self-loop or multiple edges.

When the undirected simple graph that has a weight allocated for each edge is referred to as G, the undirected simple graph G may be described with triplet as represented in Equation 1.

$$G=\{v,\varepsilon,W\} \qquad (1)$$

Here, V represents V numbers of graph vertex set, ε represents a graph edge set, and W represents a weight represented as a V×V matrix. Here, weight W may be represented as Equation 2 below.

$$W_{i,j}=W_{i,j}\geq 0 \qquad (2)$$

$W_{i,j}$ represents a weight of edge (i, j), and $W_{j,i}$ represents a weight of edge (j, i). When there is no edge connecting vertex (i, j), $W_{i,j}$=0. For example, in the case of assuming that there is no self-loop, $W_{i,i}$=0, always.

The representation is partially overlapped for a special case of the undirected simple graphs that have an edge weight. This is because matrix W includes all types of information of the graph. Accordingly, in the present invention, hereinafter, a graph is represented as G(W).

Meanwhile, referring to FIGS. 3A and 3B, the present invention provides two embodiments of graph types that may be used for processing 8×8 pixel blocks in an image or a video. Each pixel is in relation to a graph vertex, and the pixel value becomes the value of the graph vertex.

A graph edge may mean a line connecting graph vertexes. The graph edge is used for representing a certain type of statistical dependency within a signal, and in this case, a positive weigh may represent the sharpness. For example, each vertex may be connected to all of other vertexes, and weight of 0 may be allocated to an edge that connects vertexes not coupled with each other or weakly coupled. However, for simplifying the representation, the edge having the weight of 0 may be completely removed.

In the graph shown in FIG. 3A, a graph edge may be defined such that each vertex is connected to the nearest 4 adjacent vertexes. However, a block edge may be differently treated. In addition, in the graph shown in FIG. 3B, it may be defined that each vertex is connected to the nearest 8 adjacent vertexes.

FIGS. 4A and 4B show graphs of two shapes representing weights distribution as an embodiment to which the present invention is applied.

The vertex value of a graph is an independent variable based on a signal measurement (normally, modeled as an arbitrary variable), but it is required to select an edge weight in accordance with the property of a part of signal. FIGS. 4A and 4B show two exemplary graphs that represent the edge weights of different lines for a graph edge. For example, the bold lines may represent the weight of w=1, and the fine lines may represent the weight of w=0.2.

The graph shown in FIG. 4A represents the case of having "weak link" along a straight line, and represents the case of having two types of edge weights only. Here, the "weak link" means having relatively small edge weight.

This is commonly used in a graph-based image processing actually, and such a construction may represent a difference between an edge in an image and a pixel statistics between different sides.

FIG. 4B represents a distribution of an edge weight that covers irregular area. The present invention is to provide a method for processing a signal using such a distribution graph of an edge weight.

FIGS. 5A and 5B are diagrams for describing a procedure of obtaining a graph-based transform matrix based on 1-dimensional graph and 2-dimensional graph as an embodiment to which the present invention is applied.

As an embodiment of the present invention, the graph type that may be used for processing a pixel block in an image may be described using FIGS. 5A and 5B. For example, FIG. 5A shows 1-dimensional graph that corresponds to each line in the pixel block, and FIG. 5B shows 2-dimensional graph that corresponds to the pixel block.

A graph vertex is in relation to each pixel of the pixel block, and a value of the graph vertex may be represented as a pixel value. And, a graph edge may mean a line connecting the graph vertexes. The graph edge is used for representing a certain type of statistical dependency in a signal, and the value representing its sharpness may be referred to as an edge weight.

For example, FIG. 5A shows a 1-dimensional graph, 0, 1, 2 and 3 represents the position of each vertex, and $w_0$, $w_1$ and $w_2$ represent the edge weight between vertexes. FIG. 5B shows a 2-dimensional graph, and $a_{i,j}$ (i=0, 1, 2, 3, j=0, 1, 2) and $b_{kl}$ (k=0, 1, 2, l=0, 1, 2, 3) represent the edge weight between vertexes.

Each vertex may be connected to all of other vertexes, and weight of 0 may be allocated to an edge that connects vertexes not coupled with each other or weakly coupled. However, for simplifying the representation, the edge having the weight of 0 may be completely removed.

The relationship information between pixels may be represented as whether there is an edge between pixels and an edge weight when each pixel is mapped to a vertex of a graph.

In this case, GBT may be obtained through the following procedures. For example, an encoder or a decoder may obtain graph information from a target block of a video signal. From the obtained graph information, Laplacian matrix L may be obtained as represented in Equation 3 below.

$$L=D-A \qquad (3)$$

In Equation 3 above, D represents a degree matrix. For example, the degree matrix may mean a diagonal matrix including the information of a degree of each vertex. A represents an adjacency matrix that represents the interconnection (for example, edge) with an adjacent pixel by a weight.

And, with respect to the Laplacian matrix L, a GBT kernel may be obtained by performing eigen decomposition as represented in Equation 4 below.

$$L=U\Lambda U^T \qquad (4)$$

In Equation 4 above, L means a Laplacian matrix L, U means an eigen matrix, and $U^T$ means a transposed matrix of U. In Equation 4, the eigen matrix U may provide a graph-based Fourier transform specialized for a signal suitable for the corresponding model. For example, the eigen matrix U that satisfies Equation 4 may mean a GBT kernel.

FIGS. 6A-6D are views illustrating 1-dimensional (1D) graphs which may become transform bases for applying a separable transform according to an embodiment to which the present invention is applied.

Embodiments regarding 1D graphs which may become a base for one line may be described as follows.

In a first embodiment, correlation regarding one pixel pair is so small that a weight value of a corresponding edge may be set to be small. For example, a pixel pair including a block boundary may have relatively small correlation, so a small edge weight may be set for a graph edge including a block boundary.

In a second embodiment, a self-loop may be present or not at both ends, or self-loop may be present only at one end. For example, FIGS. 6A and 6B illustrate the case where the self-loop is present only at one of both ends, FIG. 6C illustrates the case where the self-loop is present at both ends of the graph, and FIG. 6D illustrates the case where the self-loop is not present at both ends of the graph. Here, the self-loop, representing dependency with an adjacent vertex, may refer to self-weight, for example. That is, a weight may be further given to a portion where the self-loop is present.

In another embodiment of the present invention, an extra 1D separable transform set may be defined according to TU sizes. In the case of non-separable transform, transform coefficient data is increased to $O(N^4)$ as a TU size is increased, but in the case of the separable transform, the transform coefficient data is increased to $O(N^2)$. Thus, the following configuration may be formed by combining several 1D separable transforms forming a base.

For example, as a 1D separable transform template, a template in which the self-loop is present on the left as illustrated in FIG. 6A, a template in which the self-loop is present on the right as illustrated in FIG. 68, a template in which the self-loop is present at both ends as illustrated in FIG. 6C, and a template in which the self-loop is not present on both sides as illustrated in FIG. 6D, may be provided. When these templates are all available, the four cases may be possible in rows and columns, and thus, template indices for a total of 16 combinations may be defined.

In another embodiment, in case where a partition boundary or an object boundary is present in the middle of a TU, a template index may be signaled and a separate template in which a small weight value is additionally given only to an edge corresponding to a boundary may be applied instead.

FIG. 7 is a view illustrating a method for applying a different separable transform to each line of a 2-dimensional (2D) graph according to an embodiment to which the present invention is applied.

FIG. 7 illustrates 2D graph corresponding to a pixel block, in which a graph vertex is associated with each pixel of the pixel block, and a value of the graph vertex may be expressed as a pixel value. Here, the line connecting the graph vertices refers to a graph edge. As discussed above, the graph edge is used to indicate statistical dependency in a certain form within a signal, and a value indicating strength thereof may be called an edge weight. For example, referring to FIG. 7, a 2D graph is illustrated in which $a_{ij}$ (i=0, 1, 2, 3, j=0, 1, 2), $b_{kl}$ (k=0, 1, 2, l=0, 1, 2, 3) indicate an edge weight between vertices.

In an embodiment to which the present invention is applied, in the case of a 2D graph connecting graph edges only for pixels neighboring in a right angle direction (which may also be called a 4-connected graph), 2D NSGBT (non-separable GBT) may be applied but a 1D SGBT (separable GBT) may be applied to a row direction and a column direction.

For example, since each vertex of the 2D graph of FIG. 7 has a maximum of four neighboring vertices, the graph may be a 4-connected graph, and here, a 2D NSGBT (non-separable GBT) kernel may be generated and applied by using an edge weight ($a_{ij}$, $b_{kl}$) of each side.

In a specific example, in the row direction, 1D SGBT (separable GBT) for the graph including edge weights of $a_{i0}$, $a_{i1}$, $a_{i2}$ of an i-th row is applied to each column, and regarding each column, 1D SGBT (separable GBT) regarding a graph including edge weights of $b_{0j}$, $b_{1j}$, $b_{2j}$ of a j-th column may be applied to each row.

In another example, in the case of an arbitrary 4-connected graph, different 1D SGBT (separable GBT) may be applied to each line (in both a horizontal direction and a vertical direction). For example, in case where combinations of edge weights for each of column and row are different in FIG. 7, 1D SGBT for each combination may be applied.

Meanwhile, in case where a GBT template set for a N×N TU includes M number of 4-connected graphs, a total of M number of $N^2 \times N^2$ transform matrices should be prepared, increasing a memory demand for storing the transform matrices. Thus, if one 4-connected graph can be combined to at least one 1D graph element so as to be configured, only transform for the at least one 1D graph element is required, and thus, a memory amount for storing the transform matrices may be reduced.

In an embodiment of the present invention, various 4-connected 2D graphs may be generated by a limited number of 1D graph elements, whereby a GBT template set appropriate for each mode combination may be customized. Although a total number of GBT templates is increased, the number of 1D transforms forming the base may remain as is, and thus, a required amount of memory may be minimized. For example, combinations of a limited number of ($a_{i0}$, $a_{i1}$, $a_{i2}$) and ($b_{0j}$, $b_{1j}$, $b_{2j}$) may be prepared and appropriately connected in units of 1D graphs for each combination to generate one 4-connected 2D graph.

For example, regarding a current coding block, if graph edge information, partition information, inter-pixel correlation information, and the like, can be received from a bit stream or derived from surrounding information, combinations of 1D transforms may be customized using these information.

FIG. 8 is a schematic block diagram of an encoder which processes a graph-based signal according to an embodiment to which the present invention is applied.

Referring to FIG. 8, an encoder 800 to which the present invention is applied includes a graph-based transform unit 810, a quantization unit 820, a transform-quantization unit 830, an inverse-transform unit 840, a buffer 850, a prediction unit 860, and an entropy-encoding unit 870.

The encoder 800 receives a video signal and subtracts a predicted signal output from the prediction unit 860 from the video signal to generate a prediction error. The generated prediction error is transmitted to the graph-based transform unit 810, and the graph-based transform unit 810 generates a transform coefficient by applying a transform scheme to the prediction error.

In another embodiment to which the present invention is applied, the graph-based transform unit 810 may compare an obtained graph-based transform matrix with the transform matrix obtained from the transform unit 120 of FIG. 1 and select a more appropriate transform matrix.

The quantization unit 820 quantizes the generated transform coefficient and transmits the quantized coefficient to the entropy-encoding unit 820.

The entropy-encoding unit 820 performs entropy encoding on the quantized signal and outputs an entropy-coded signal.

The quantized signal output from the quantization unit 820 may be used to generate a predicted signal. For example, the inverse-quantization unit 830 within the loop of the encoder 800 and the inverse-transform unit 840 may perform inverse-quantization and inverse-transform on the quantized signal such that the quantized signal may be reconstructed to a prediction error. The reconstructed signal may be generated by adding the reconstructed prediction error to the predicted signal output from the prediction unit 860.

The buffer 850 stores a reconstructed signal for a future reference of the prediction unit 860.

The prediction unit 860 may generate a predicted signal using a signal which was previously reconstructed and stored in the buffer 850. The generated predicted signal is subtracted from the original video signal to generate a residual signal, and the residual signal is transmitted to the graph-based transform unit 810.

FIG. 9 is a schematic block diagram of a decoder which processes a graph-based signal according to an embodiment to which the present invention is applied.

A decoder 900 of FIG. 9 receives a signal output from the encoder 800 of FIG. 8.

An entropy decoding unit 910 performs entropy-decoding on a received signal. The inverse-quantization unit 920 obtains a transform coefficient from the entropy-decoded signal based on a quantization step size.

The inverse-transform unit 930 performs inverse-transform on a transform coefficient to obtain a residual signal. Here, the inverse-transform may refer to inverse-transform for graph-based transform obtained from the encoder 800.

The obtained residual signal may be added to the predicted signal output from the prediction unit 950 to generate a reconstructed signal.

The buffer 940 may store the reconstructed signal for future reference of the prediction unit 950.

The prediction unit 950 may generate a predicted signal based on a signal which was previously reconstructed and stored in the buffer 940.

FIG. 10 is an internal block diagram of a graph-based transform unit according to an embodiment to which the present invention is applied.

Referring to FIG. 10, the graph-based transform unit 810 may include a graph parameter determining unit 811, a graph generating unit 813, a transform matrix determining unit 815, and a transform performing unit 817.

The graph parameter determining unit 811 may extract a graph parameter of a graph corresponding to a target unit of a video signal or a residual signal. For example, the graph parameter may include at least one of a vertex parameter and an edge parameter. The vertex parameter may include at least one of a vertex position and the number of vertices, and the edge parameter may include at least one of an edge weight value and the number of edge weights. Also, the graph parameter may be defined to a predetermined number of sets.

According to an embodiment of the present invention, a graph parameter extracted from the graph parameter determining unit 811 may be expressed as a generalized form.

The graph generating unit 813 may generate a graph based on a graph parameter extracted from the graph parameter determining unit 811. Here, the graph may include a line graph to which a weight is applied or a weight is not applied. The line graph may be generated for each of a row or column of a target block.

The transform matrix determining unit 815 may determine a transform matrix appropriate for the graph. For example, the transform matrix may be determined based on rate distortion (RD) performance. Also, in this disclosure, the transform matrix may be replaced with an expression of transform or a transform kernel so as to be used.

In an embodiment of the present invention, the transform matrix may be a value already determined in the encoder or the decoder, and here, the transform matrix determining unit 815 may be derived from a place where the transform matrix appropriate for the graph is stored.

In another embodiment of the present invention, the transform matrix determining unit 815 may generate a 1D transform kernel for a line graph, and generate a 2D separable graph-based transform kernel by combining two of 1D transform kernels. The transform matrix determining unit 815 may determine a transform kernel appropriate for the graph among the 2D separable graph-based transform kernels based on the RD performance.

The transform performing unit 817 may perform transform using the transform matrix obtained from the transform matrix determining unit 815.

In this disclosure, functions are sub-divided and described to describe a process of performing graph-based transform, but the present invention is not limited thereto. For example, the graph-based transform unit 810 may include a graph generating unit and a transform unit, and here, a function of the graph parameter determining unit 811 may be performed in the graph generating unit, and functions of the transform matrix determining unit 815 and the transform performing unit 817 may be performed in the transform unit. Also, a function of the transform unit may be divided into a transform matrix determining unit and a transform performing unit.

FIG. 11 is a flowchart for describing a method for deriving a graph-based transform kernel using a transform index as an embodiment to which the present invention is applied.

First, a decoder may receive a transform index for a target block from a video signal (S1110). Here, the transform index represents a graph-based transform that is going to be applied to the target block. Step S1110 may be performed in a parsing unit in the decoder.

As an embodiment of the present invention, when the target block includes M or N sub-blocks which are partitioned in a horizontal direction or a vertical direction, the transform index corresponds to each sub-block.

As an embodiment of the present invention, the transform index may be received for each of at least one of a coding unit, a prediction unit or a transform unit.

The decoder may derive a graph-based transform kernel corresponding to the transform index (S1120). Here, the graph-based transform kernel may be generated based on at least one of boundary information, a prediction mode or a size of transform unit The boundary information means information for representing a property of a signal for a block boundary, and for example, the boundary information may include at least one of an edge weight, a self-loop number and self-loop weight. In this case, the self-loop number may mean the number of self-loops or the position of a self-loop. In this specification, the self-loop number has been described, but may be substituted with a self-loop position and expressed.

The edge weight may be separately set into an edge weight in a left boundary and an edge weight in a right boundary, and the self-loop weight may also be separately set into a self-loop weight in a left boundary and a self-loop weight in a right boundary. In addition, the edge weight may have a directional graph (hereinafter, referred to as 'digraph') of which weight is different in a boundary.

The edge weight or the self-loop weight may be represented as three values including a strong weight, no weight and a weak weight. For example, the strong weight may be represented as 2, the no weight may be represented as 1, and the weak weight may be represented as 0. However, the present invention is not limited thereto, but the weight value may be represented as at least one value.

As another embodiment of the present invention, the graph-based transform kernel may be derived for each sub-block according to the transform index, and different transform types with each other may be applied to at least two or more sub-blocks. For example, the different transform types with each other may include at least two of DCT (Discrete Cosine Transform), DST, (Discrete Sine Transform), ADST (Asymmetric Discrete Sine Transform) and RADST (Reverse ADST).

As an embodiment of the present invention, the graph-based transform kernel may be a two-dimensional separable graph-based transform kernel generated based on a combination of a plurality of one dimensional graph-based transforms.

As an embodiment of the present invention, the graph-based transform kernel may be predefined for each of columns and rows. In this case, an encoder or a decoder may know the graph-based transform kernel in advance, for example, may store it as a table.

Meanwhile, the decoder may decode the target block based on the graph-based transform kernel (S1130).

Steps S1120 to S1130 may be performed in an inverse transform unit in the decoder.

FIG. 12 is a flowchart for describing a method for generating an optimal transform kernel according to a property of a video signal or a residual signal as an embodiment to which the present invention is applied.

In an embodiment of the present invention, an encoder may generate or design a line graph. The encoder may generate a 1D graph-based transform (GBT) associated with the line graph, and in this case, the 1D GBT may be generated by using a generalized Laplacian operator.

Here, assuming that there are an adjacent matrix A and a graph G(A) defined thereof, the Laplacian matrix L may be obtained through Equation 5 below.

$$L = D - A + S \quad (5)$$

In Equation 5 above, D represents a degree matrix, and for example, the degree matrix may mean a diagonal matrix that includes information of degree of each vertex. A represents an adjacency matrix that represents a connection relation (e.g., an edge) with an adjacent pixel as a weight. S represents a diagonal matrix that represents a self-loop in the nodes in G.

In addition, for the Laplacian matrix L, an optimal transform kernel can be obtained by performing eigen decomposition as represented in Equation 6 below.

$$L = U \Lambda U^T \quad (6)$$

In Equation 6 above, L means a Laplacian matrix L, U means an eigen matrix, and $U^T$ means a transposed matrix of U. In Equation 6, the eigen matrix U may provide a graph-based Fourier transform specialized for a signal suitable for the corresponding model. For example, the eigen matrix U that satisfies Equation 6 may mean a GBT kernel.

Here, the columns of the eigen matrix U may mean basis vectors of the GBT, When a graph does not have a self-loop, a generalized Laplacian matrix is as represented as Equation 3 above.

An embodiment of the present invention provides a method for generating an optimal transform kernel according to a property of a video signal or a residual signal.

First, an encoder receives a video signal, and generates a prediction error (or residual signal) by subtracting a prediction signal output in a prediction unit from the video signal.

The prediction error is transmitted to a graph-based transform unit, and the graph-based transform unit may generate a graph according to a property of the video signal or the prediction error (S1210). The property of the video signal or the prediction error may be presented as boundary information. For example, the boundary information may include at least one of an edge weight, a number of self-loop and a self-loop weight, and various embodiments described above may be applied thereto.

The encoder may determine an optimal transform kernel by using the graph (S1220).

As another embodiment of the present invention, an encoder may derive a predefined transform kernel by using the graph. In this case, the optimal transform kernel may correspond to one of the preconfigured values, and in this case, an encoder and a decoder may know the preconfigured values, and may store it in a table, for example. In addition, the optimal transform kernel may be defined for each column or row of a target block.

In addition, the encoder may perform a transform for the residual signal using the optimal transform kernel (S1230).

Meanwhile, in an embodiment of the present invention, a transform index that corresponds to the optimal transform kernel may be set (S1240), and the transform index may be encoded and transmitted to a decoder (S1250).

FIG. 13 is an embodiment to which the present invention is applied and is a diagram for illustrating prediction directions according to intra prediction modes.

The decoder may derive the intra prediction mode of a current processing block (S1301).

In intra prediction, a prediction mode may have a prediction direction for the position of a reference sample used for prediction. In this specification, an intra prediction mode having a prediction direction is called an Intra_Angular prediction mode or an intra direction mode. In contrast, an intra prediction mode not having a prediction direction includes an intra planar (INTRA_PLANAR) prediction mode and an intra DC (INTRA_DC) prediction mode.

Table 1 shows intra prediction modes and associated name, and FIG. 6 illustrates prediction directions according to intra predictions.

TABLE 1

| Intra prediction mode | Associated name |
| --- | --- |
| 0 | INTRA_PLANAR |
| 1 | (INTRA_DC |
| 2 ... 34 | INTRA_ANGULAR2 ... INTRA_ANGULAR34 |

In intra prediction, prediction is performed on a current processing block based on a derived prediction mode. A reference sample and detailed prediction method used for prediction are different depending on a prediction mode. If a current block is encoded in an intra prediction mode, the decoder may derive a prediction mode of the current block in order to perform prediction.

The decoder may check whether neighboring samples of a current processing block can be used for prediction and configure reference samples to be used for prediction (S1302).

In intra prediction, neighboring samples of a current processing block mean a sample neighboring the left boundary of the current processing block of an nS×nS size, a total of 2×nS samples neighboring a bottom left, a sample neighboring the top boundary of the current processing block, a total of 2×nS samples neighboring the right top, and one sample neighboring the top left of the current processing block.

However, some of neighboring samples of the current processing block may have not been encoded or may not be available. In this case, the decoder may configure reference samples to be used for prediction by substituting unavailable samples with available samples.

The decoder may perform filtering on the reference samples based on an intra prediction mode (S1303).

Whether or not to perform filtering on the reference samples may be determined based on the size of the current processing block. Furthermore, a method of filtering the reference samples may be determined by a filtering flag transmitted by the encoder.

The decoder may generate a prediction block for the current processing block based on the intra prediction mode and the reference samples (31304). That is, the decoder may generate the prediction block for the current processing block (i.e., generate a prediction sample) based on the intra prediction mode derived in the intra prediction mode derivation step (S1301) and the reference samples obtained through the reference sample configuration step (S1302) and the reference sample filtering step (S1303).

If the current processing block has been encoded in the INTRA_DC mode, in order to minimize the discontinuity of a boundary between processing blocks, the left boundary sample (i.e., a sample within a prediction block neighboring the left boundary) and top boundary sample (i.e., a sample within a prediction block neighboring the top boundary) of the prediction block at step S1304 may be filtered.

Furthermore, at step S1304, filtering may be applied to a left boundary sample or top boundary sample with respect to the vertical mode and horizontal mode of the Intra_Angular prediction modes as in the INTRA_DC mode.

This is described more specifically. If a current processing block has been encoded in the vertical mode or the horizontal mode, the value of a prediction sample may be derived based on a reference sample located in the prediction direction. In this case, a boundary sample that belongs to the left boundary sample and top boundary sample of a prediction block and that is not located in the prediction direction may neighbor a reference sample not used for prediction. That is, the distance from a reference sample not used for prediction may be much closer than the distance from a reference sample used for prediction.

Accordingly, the decoder may adaptively apply filtering to left boundary samples or top boundary samples depending on whether an intra prediction direction is the vertical direction or the horizontal direction. That is, if the intra prediction direction is the vertical direction, the decoder may apply filtering to the left boundary samples. If the intra prediction direction is the horizontal direction, the decoder may apply filtering to the top boundary samples.

FIGS. 14 and 15 are embodiments to which the present invention is applied and are diagram for illustrating a method of predicting a j-th column and an i-th row using at least one of a top boundary pixel and a right-up boundary pixel.

The present invention provides a method of generating a transform kernel according to a prediction angle and processing a signal using the transform kernel. Specifically, the present invention provides a method of generating a graph in a row and column direction with respect to an intra prediction mode and deriving a separable graph-based transform kernel based on the generated graph.

Furthermore, the present invention provides a method of determining a correlation coefficient or a weight value indicating a correlation between pixels when generating a graph.

In the case of intra prediction, prediction may be performed using at least one of a left boundary pixel, a top boundary pixel, a right-up boundary pixel, a left-bottom boundary pixel and a left-up corner pixel depending on a prediction mode or a prediction direction. Accordingly, the present invention may be applied to various embodiments.

First, FIGS. 14 and 15 show cases where prediction is performed from at least one of a top boundary pixel and a right-up boundary pixel. For example, the case where prediction is performed from the top boundary pixel or the right-up boundary pixel may correspond to the intra prediction modes 26 to 34 (refer to FIG. 13).

For a detailed example, FIG. 14 shows a column of a prediction pixel predicted using at least one of the top boundary pixel and the right-up boundary pixel if intra prediction modes are 26 to 34. For example, if a left boundary pixel or a left-bottom boundary pixel is marked as Xi0 and the top boundary pixel or the right-up boundary pixel is marked as X0j, the column of a prediction pixel may be marked as Xij.

Furthermore, FIG. 15 shows a row of a prediction pixel predicted using at least one of a top boundary pixel and a right-up boundary pixel if intra prediction modes are 26 to 34. For example, if a left boundary pixel or a left-bottom boundary pixel is marked as Xi0 and the top boundary pixel or the right-up boundary pixel is marked as X0j, the row of a prediction pixel may be marked as Xij.

In the present invention, a row of a prediction pixel and a column of a prediction pixel corresponding to an intra prediction mode may be generated, and a residual signal may be generated from the row of a prediction pixel and the column of a prediction pixel. A 1D graph corresponding to the residual signal may be generated. In this case, the ID graph may correspond to each row of a prediction pixel or each column of a prediction pixel of the residual signal.

Furthermore, a graph-based transform kernel may be derived based on the generated ID graph. Hereinafter, a method of generating a ID graph and a method of deriving a graph-based transform kernel are described.

FIG. 16 is an embodiment to which the present invention is applied and shows a 1D graph for a j-th column predicted using at least one of a top boundary pixel and a right-up boundary pixel.

First, it is assumed that a pixel of a specific j-th column within a block is predicted from at least one of a top boundary pixel and a right-up boundary pixel. A residual signal may be generated through intra prediction from the at least one of the top boundary pixel and the right-up boundary pixel, and a 1D graph may be generated for the j-th column as in FIG. 16.

The first pixel at the top of the j-th column has a high correlation with a top boundary pixel in the vertical direction and thus may be expressed as a self-loop having a weight of $w_s$. The remaining pixels may be interconnected so that a correlation coefficient between the pixels has $w_k$. In this case, $w_s$ may be called a self-loop weight. The self-loop weight may have a different value depending on a prediction angle and may be expressed as in Equation 7.

$$w_s = \beta_{ru} \frac{\Delta r}{\Delta c}, 0 < w_s \leq 1 \qquad (7)$$

In this case, $\Delta c$ and $\Delta r$ mean variations of a prediction angle in the column direction and row direction, respectively, and this may be called an angle parameter. Furthermore, Δr/Δc indicates an inclination of the prediction angle.

In Equation 7, the first pixel becomes distant from a reference pixel as the prediction angle increases, and thus a correlation between a current pixel and the reference pixel is reduced. As a result, the self-loop weight $w_s$ is reduced. In this case, the adjustment parameter $\beta_{ru}$ indicates a value that maps the self-loop weight $w_s$ to a value between 0 and 1. $w_s$ and $w_k$ may have various values depending on a correlation between pixels or weight. For example, assuming that $w_s$=0.98, $w_0$=$w_1$= . . . =$w_{N-2}$=1, a Laplacian matrix may be calculated as in Equation 8.

$$D = \begin{bmatrix} 1 & 0 & 0 & 0 & 0 & 0 & 0 & 0 \\ 0 & 2 & 0 & 0 & 0 & 0 & 0 & 0 \\ 0 & 0 & 2 & 0 & 0 & 0 & 0 & 0 \\ 0 & 0 & 0 & 2 & 0 & 0 & 0 & 0 \\ 0 & 0 & 0 & 0 & 2 & 0 & 0 & 0 \\ 0 & 0 & 0 & 0 & 0 & 2 & 0 & 0 \\ 0 & 0 & 0 & 0 & 0 & 0 & 2 & 0 \\ 0 & 0 & 0 & 0 & 0 & 0 & 0 & 1 \end{bmatrix} \quad A = \begin{bmatrix} 0 & 1 & 0 & 0 & 0 & 0 & 0 & 0 \\ 1 & 0 & 1 & 0 & 0 & 0 & 0 & 0 \\ 0 & 1 & 0 & 1 & 0 & 0 & 0 & 0 \\ 0 & 0 & 1 & 0 & 1 & 0 & 0 & 0 \\ 0 & 0 & 0 & 1 & 0 & 1 & 0 & 0 \\ 0 & 0 & 0 & 0 & 1 & 0 & 1 & 0 \\ 0 & 0 & 0 & 0 & 0 & 1 & 0 & 1 \\ 0 & 0 & 0 & 0 & 0 & 0 & 1 & 0 \end{bmatrix} \quad (8)$$

$$S = \begin{bmatrix} 0.98 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \end{bmatrix}$$

A Laplacian matrix may be obtained as in Equation 9 from Equation 8, $$L = D - A + S = \begin{bmatrix} 1.98 & -1 & 0 & 0 & 0 & 0 & 0 & 0 \\ -1 & 2 & -1 & 0 & 0 & 0 & 0 & 0 \\ 0 & -1 & 2 & -1 & 0 & 0 & 0 & 0 \\ 0 & 0 & -1 & 2 & -1 & 0 & 0 & 0 \\ 0 & 0 & 0 & -1 & 2 & -1 & 0 & 0 \\ 0 & 0 & 0 & 0 & -1 & 2 & -1 & 0 \\ 0 & 0 & 0 & 0 & 0 & -1 & 2 & -1 \\ 0 & 0 & 0 & 0 & 0 & 0 & -1 & 1 \end{bmatrix} \quad (9)$$

A graph-based transform kernel corresponding to the residual signal predicted from at least one of the top boundary pixel and the right-up boundary pixel may be obtained using the Laplacian matrix and Equation 6. In this case, in the case of a vertical prediction mode, the graph-based transform kernel may be obtained assuming $w_s$=1.

FIG. 17 is an embodiment to which the present invention is applied and shows 1D graph for an i-th row predicted using at least one of a top boundary pixel and a right-up boundary pixel.

In FIG. 17, it is assumed that a pixel of a specific i-th row within a block is predicted from at least one of a top boundary pixel and a right-up boundary pixel. A residual signal may be generated through intra prediction from at least one of the top boundary pixel and the right-up boundary pixel. A 1D graph may be generated for the i-th row as in FIG. 17. Left and right boundary pixels do not have a self-loop at the boundary because they have not correlation with a reference pixel.

For example, if $w_0$=$w_1$= . . . =$w_{N-2}$=1 is assumed in FIG. 17, a Laplacian matrix may be calculated as in Equation 10.

$$D = \begin{bmatrix} 1 & 0 & 0 & 0 & 0 & 0 & 0 & 0 \\ 0 & 2 & 0 & 0 & 0 & 0 & 0 & 0 \\ 0 & 0 & 2 & 0 & 0 & 0 & 0 & 0 \\ 0 & 0 & 0 & 2 & 0 & 0 & 0 & 0 \\ 0 & 0 & 0 & 0 & 2 & 0 & 0 & 0 \\ 0 & 0 & 0 & 0 & 0 & 2 & 0 & 0 \\ 0 & 0 & 0 & 0 & 0 & 0 & 2 & 0 \\ 0 & 0 & 0 & 0 & 0 & 0 & 0 & 1 \end{bmatrix} \quad A = \begin{bmatrix} 0 & 1 & 0 & 0 & 0 & 0 & 0 & 0 \\ 1 & 0 & 1 & 0 & 0 & 0 & 0 & 0 \\ 0 & 1 & 0 & 1 & 0 & 0 & 0 & 0 \\ 0 & 0 & 1 & 0 & 1 & 0 & 0 & 0 \\ 0 & 0 & 0 & 1 & 0 & 1 & 0 & 0 \\ 0 & 0 & 0 & 0 & 1 & 0 & 1 & 0 \\ 0 & 0 & 0 & 0 & 0 & 1 & 0 & 1 \\ 0 & 0 & 0 & 0 & 0 & 0 & 1 & 0 \end{bmatrix} \quad (10)$$

A Laplacian matrix may be obtained as in Equation 11 from Equation 10.

$$L = D - A + S = \begin{bmatrix} 1 & -1 & 0 & 0 & 0 & 0 & 0 & 0 \\ -1 & 2 & -1 & 0 & 0 & 0 & 0 & 0 \\ 0 & -1 & 2 & -1 & 0 & 0 & 0 & 0 \\ 0 & 0 & -1 & 2 & -1 & 0 & 0 & 0 \\ 0 & 0 & 0 & -1 & 2 & -1 & 0 & 0 \\ 0 & 0 & 0 & 0 & -1 & 2 & -1 & 0 \\ 0 & 0 & 0 & 0 & 0 & -1 & 2 & -1 \\ 0 & 0 & 0 & 0 & 0 & 0 & -1 & 1 \end{bmatrix} \quad (11)$$

A graph-based transform kernel for each row of a prediction signal may be obtained from at least one of the top boundary pixel and the right-up boundary pixel using the Laplacian matrix and Equation 6.

FIGS. 18 and 19 are embodiments to which the present invention is applied and are diagrams for illustrating a method of predicting a j-th column and an i-th row using at least one of a left boundary pixel and a left-bottom boundary pixel.

The present invention provides a method of generating a transform kernel according to a prediction angle and processing a signal using the transform kernel. Specifically, the present invention provides a method of generating a graph in row and column directions with respect to an intra prediction mode and deriving a separable graph-based transform kernel based on the generated graph.

Furthermore, the present invention provides a method of determining a correlation coefficient or weight value indicating a correlation between pixels when generating a graph.

In the case of intra prediction, prediction may be performed using at least one of a left boundary pixel, a top boundary pixel, a right-up boundary pixel and a left-bottom boundary pixel according to a prediction mode or a prediction direction. Accordingly, the present invention may be applied to various embodiments.

FIGS. 18 and 19 show cases where prediction is performed using at least one of a left boundary pixel and a left-bottom boundary pixel. For example, the case where prediction is performed using at least one of the left boundary pixel and the left-bottom boundary pixel may correspond to the intra prediction modes 2 to 9 (refer to FIG. 13).

For a detailed example, FIG. 18 shows a column of a prediction pixel predicted using at least one of a left boundary pixel and a left-bottom boundary pixel if intra prediction modes are 2 to 9. For example, if the left boundary pixel or left-bottom boundary pixel is marked as Xi0 and a top boundary pixel or right-up boundary pixel is marked as X0i, the column of a prediction pixel may be marked as Xij.

Furthermore, FIG. 19 shows a row of a prediction pixel predicted using at least one of a left boundary pixel and a left-bottom boundary pixel if intra prediction modes are 2 to 9. For example, if the left boundary pixel or left-bottom boundary pixel is marked as Xi0 and a top boundary pixel or right-up boundary pixel is marked as X0j, the row of a prediction pixel may be marked as Xij.

In the present invention, a row of a prediction pixel and a column of a prediction pixel corresponding to an intra prediction mode may be generated, a residual signal may be generated from the row of a prediction pixel and the column of a prediction pixel, and a 1D graph corresponding to the residual signal may be generated. In this case, the ID graph may correspond to each row of a prediction pixel or each column of a prediction pixel of the residual signal.

Furthermore, a graph-based transform kernel may be derived based on the generated ID graph. A method of generating a ID graph and a method of deriving a graph-based transform kernel are described below.

FIG. 20 is an embodiment to which the present invention is applied and shows a 1D graph for a j-th column predicted using at least one of a left boundary pixel and a left-bottom boundary pixel.

In FIG. 20, it is assumed that a pixel of a specific j-th column within a block is predicted from at least one of a left boundary pixel and a left-bottom boundary pixel. A residual signal may be generated through intra prediction from the at least one of the left boundary pixel and the left-bottom boundary pixel, and a 1D graph may be generated for the j-th column as in FIG. 20.

Upper and lower boundary pixels do not have a self-loop at the boundary because they do not have a correlation with a reference pixel. Furthermore, the pixels are connected by a correlation coefficient or weight $w_k$ between the pixels.

The description of FIG. 16 may be applied, and a Laplacian matrix may be obtained from the equations of FIG. 16. A redundant description is omitted hereinafter.

FIG. 21 is an embodiment to which the present invention is applied and shows a 1D graph for an i-th row predicted using at least one of a left boundary pixel and a left-bottom boundary pixel.

In FIG. 21, it is assumed that a pixel of a specific i-th row within a block is predicted from at least one of a left boundary pixel and a left-bottom boundary pixel. A residual signal may be generated through intra prediction from the at least one of the left boundary pixel and the left-bottom boundary pixel, and a 1D graph may be generated for the i-th row as in FIG. 21.

In the i-th row, the leftmost first pixel has a very high correlation with a left boundary pixel in a horizontal direction and thus may be expressed as a self-loop having a weight of $w_s$. The remaining pixels may be interconnected so that a correlation coefficient between the pixels is $w_k$. In this case, $w_s$ may be called a self-loop weight, and the self-loop weight may have a different value depending on a prediction angle and may be expressed as in Equation 12.

$$w_s = \beta_{lb} \frac{\Delta c}{\Delta r}, 0 < w_s \leq 1 \tag{7}$$

In this case, $\Delta c$ and $\Delta r$ mean variations of the prediction angle in the column direction and row direction, respectively. This may be called an angle parameter. Furthermore, $\Delta r/\Delta c$ indicates an inclination of the prediction angle.

In Equation 12, since the first pixel becomes distant from a reference pixel as the prediction angle increases, a correlation between a current pixel and the reference pixel is reduced. Accordingly, the self-loop weight $w_s$ is reduced. For example, this may mean that the prediction angle is increased as it deviates from an aspect in which it has been disposed in a straight light. In this case, an adjustment parameter $\beta_{ru}$ indicates a value that maps the self-loop weight $w_s$ to a value between 0 and 1. $w_s$ and $w_k$ may have various values a correlation between pixels or weight. For example, assuming that $w_s$=0.98, $w_0$=$w_1$= . . . =$w_{N-2}$=1, a Laplacian matrix may be calculated as in Equation 13.

$$D = \begin{bmatrix} 1 & 0 & 0 & 0 & 0 & 0 & 0 & 0 \\ 0 & 2 & 0 & 0 & 0 & 0 & 0 & 0 \\ 0 & 0 & 2 & 0 & 0 & 0 & 0 & 0 \\ 0 & 0 & 0 & 2 & 0 & 0 & 0 & 0 \\ 0 & 0 & 0 & 0 & 2 & 0 & 0 & 0 \\ 0 & 0 & 0 & 0 & 0 & 2 & 0 & 0 \\ 0 & 0 & 0 & 0 & 0 & 0 & 2 & 0 \\ 0 & 0 & 0 & 0 & 0 & 0 & 0 & 1 \end{bmatrix} A = \begin{bmatrix} 0 & 1 & 0 & 0 & 0 & 0 & 0 & 0 \\ 1 & 0 & 1 & 0 & 0 & 0 & 0 & 0 \\ 0 & 1 & 0 & 1 & 0 & 0 & 0 & 0 \\ 0 & 0 & 1 & 0 & 1 & 0 & 0 & 0 \\ 0 & 0 & 0 & 1 & 0 & 1 & 0 & 0 \\ 0 & 0 & 0 & 0 & 1 & 0 & 1 & 0 \\ 0 & 0 & 0 & 0 & 0 & 1 & 0 & 1 \\ 0 & 0 & 0 & 0 & 0 & 0 & 1 & 0 \end{bmatrix}$$

$$S = \begin{bmatrix} 0.98 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \end{bmatrix} \tag{13}$$

A Laplacian matrix may be obtained as in Equation 14 from Equation 13.

$$L = D - A + S = \begin{bmatrix} 1 & -1 & 0 & 0 & 0 & 0 & 0 & 0 \\ -1 & 2 & -1 & 0 & 0 & 0 & 0 & 0 \\ 0 & -1 & 2 & -1 & 0 & 0 & 0 & 0 \\ 0 & 0 & -1 & 2 & -1 & 0 & 0 & 0 \\ 0 & 0 & 0 & -1 & 2 & -1 & 0 & 0 \\ 0 & 0 & 0 & 0 & -1 & 2 & -1 & 0 \\ 0 & 0 & 0 & 0 & 0 & -1 & 2 & -1 \\ 0 & 0 & 0 & 0 & 0 & 0 & -1 & 1 \end{bmatrix} \tag{14}$$

A graph-based transform kernel corresponding to the residual signal obtained through prediction from at least one of the left boundary pixel and the left-bottom boundary pixel may be obtained using the Laplacian matrix and Equation 6. In this case, in the case of a horizontal prediction mode (mode 10), the graph-based transform kernel may be obtained assuming that $w_s$=1.

FIGS. 22 and 23 are embodiments to which the present invention is applied and are diagrams for illustrating a method of predicting a j-th column and an i-th row using at least one of a left boundary pixel, a top boundary pixel, and a left-up corner pixel.

In FIG. 22, it is assumed that the pixels of a j-th column are predicted using at least one of a left boundary pixel, a top boundary pixel, and a left-up corner pixel. For example, the case of FIG. 22 may correspond to the intra prediction modes 11 to 25.

For a detailed example, FIG. 22 shows a column of a prediction pixel predicted using at least one of the left boundary pixel, the top boundary pixel, and the left-up corner pixel if the intra prediction modes are 11 to 25. For example, if the left boundary pixel is marked as Xi0 and the top boundary pixel is marked as X0j, the column of a prediction pixel may be marked as Xij.

Furthermore, FIG. 23 shows a row of a prediction pixel predicted using at least one of a left boundary pixel, a top boundary pixel, and a left-up corner pixel if the intra prediction modes are 11 to 25. For example, if the left boundary pixel is marked as Xi0 and the top boundary pixel is marked as X0j, the row of a prediction pixel may be marked as Xij.

In the present invention, a row of a prediction pixel and a column of a prediction pixel corresponding to an intra prediction mode are generated, and a residual signal may be generated from the row of a prediction pixel and the column of a prediction pixel. In this case, unlike in the previous embodiments, reference pixels are located in all of the rows and columns of block boundaries, and intra prediction is performed from the reference pixels.

Furthermore, a 1D graph corresponding to the residual signal may be generated. In this case, the ID graph may correspond to each row of a prediction pixel or each column of a prediction pixel of the residual signal.

Furthermore, a graph-based transform kernel may be derived based on the generated ID graph. A method of generating the ID graph and a method of deriving the graph-based transform kernel are described below.

FIG. 24 is an embodiment to which the present invention is applied and shows the correlation coefficients of reference pixels if prediction is performed using at least one of a left boundary pixel, a top boundary pixel, and a left-up corner pixel.

In the present invention, intra prediction may be performed from at least one of a left boundary pixel, a top boundary pixel, and a left-up corner pixel, a residual signal may be generated using a prediction signal, and 1D graphs may be generated for a j-th column and an i-th row as in FIGS. 22 and 23.

In the case of the embodiment of the present invention, since reference pixels are located in all of the rows and columns of block boundaries, a correlation coefficient or weight between pixels may be defined as in FIG. 24.

For example, referring to FIG. 24, $w_0^r, \ldots, w_{N-2}^r$ indicates a correlation coefficient between reference pixels present in a column, and $w_0^c, \ldots, w_{N-2}^c$ indicates a correlation coefficient between reference pixels present in a row.

FIG. 25 is an embodiment to which the present invention is applied and shows a 1D graph for a j-th column predicted using at least one of a left boundary pixel, a top boundary pixel, and a left-up corner pixel.

In FIG. 25, it is assumed that a pixel of a specific j-th column within a block is predicted from at least one of a left boundary pixel, a top boundary pixel, and a left-up corner pixel. Intra prediction may be performed from at least one of the left boundary pixel, the top boundary pixel, and the left-up corner pixel, a residual signal may be generated from the at least one of the left boundary pixel, the top boundary pixel, and the left-up corner pixel, and a 1D graph may be generated for the j-th column as in FIG. 25.

Likewise, the first pixel at the top of the j-th column has a very high correlation with a top boundary pixel in the vertical direction and thus may be expressed as a self-loop having a weight of $w_s$. The correlation coefficient or weight defined in FIG. 24 may be applied to a correlation coefficient or weight between the pixels of respective lines. In this case, $w_s$ may be called a self-loop weight, and the self-loop weight may have a different value depending on a prediction angle.

For example, in the case of an 8×8 block, a Laplacian matrix may be obtained as in Equation 18 using Equations 15 to 17.

$$D = \begin{bmatrix} w_2^c & 0 & 0 & 0 & 0 & 0 & 0 & 0 \\ 0 & w_2^c + w_1^c & 0 & 0 & 0 & 0 & 0 & 0 \\ 0 & 0 & w_1^c + w_0^c & 0 & 0 & 0 & 0 & 0 \\ 0 & 0 & 0 & w_0^c + w_0^r & 0 & 0 & 0 & 0 \\ 0 & 0 & 0 & 0 & w_0^r + w_1^r & 0 & 0 & 0 \\ 0 & 0 & 0 & 0 & 0 & w_1^r + w_2^r & 0 & 0 \\ 0 & 0 & 0 & 0 & 0 & 0 & w_2^r + w_3^r & 0 \\ 0 & 0 & 0 & 0 & 0 & 0 & 0 & w_3^r \end{bmatrix} \quad (15)$$

$$A = \begin{bmatrix} 0 & w_2^c & 0 & 0 & 0 & 0 & 0 & 0 \\ w_2^c & 0 & w_1^c & 0 & 0 & 0 & 0 & 0 \\ 0 & w_1^c & 0 & w_0^c & 0 & 0 & 0 & 0 \\ 0 & 0 & w_0^c & 0 & w_0^r & 0 & 0 & 0 \\ 0 & 0 & 0 & w_0^r & 0 & w_1^r & 0 & 0 \\ 0 & 0 & 0 & 0 & w_1^r & 0 & w_2^r & 0 \\ 0 & 0 & 0 & 0 & 0 & w_2^r & 0 & w_3^r \\ 0 & 0 & 0 & 0 & 0 & 0 & w_3^r & 0 \end{bmatrix} \quad (16)$$

$$S = \begin{bmatrix} w_s & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \end{bmatrix} \quad (17)$$

$$L = D - A + S = \begin{bmatrix} w_2^c + w_s & -w_2^c & 0 & 0 & 0 & 0 & 0 & 0 \\ -w_2^c & w_2^c + w_1^c & -w_1^c & 0 & 0 & 0 & 0 & 0 \\ 0 & -w_1^c & w_1^c + w_0^c & -w_0^c & 0 & 0 & 0 & 0 \\ 0 & 0 & -w_0^c & w_0^c + w_0^r & -w_0^r & 0 & 0 & 0 \\ 0 & 0 & 0 & -w_0^r & w_0^r + w_1^r & -w_1^r & 0 & 0 \\ 0 & 0 & 0 & 0 & -w_1^r & w_1^r + w_2^r & -w_2^r & 0 \\ 0 & 0 & 0 & 0 & 0 & -w_2^r & w_2^r + w_3^r & -w_3^r \\ 0 & 0 & 0 & 0 & 0 & 0 & -w_3^r & w_3^r \end{bmatrix} \quad (18)$$

As in the present embodiment, if intra prediction is performed using at least one of a left boundary pixel, a top boundary pixel, and a left-up corner pixel, the intra prediction is performed from a row and column of different properties located in different blocks. Accordingly, as in Equation 18, a Laplacian matrix can be obtained using a different correlation coefficient or weight, and a graph-based transform kernel may be obtained using the Laplacian matrix.

In another embodiment, embodiments in which a pixel of a specific i-th row within a block is predicted and a 1D graph is generated for an i-th row may also be applied similarly with reference to the aforementioned embodiments.

According to the present invention, different graph-based transform kernels in a row direction and a column direction may be generated depending on a prediction angle, and a transform kernel may be applied to both directions. Furthermore, although a direction mode has any prediction angle with respect to an N×N block size, a graph may be generated using a correlation coefficient or weight (e.g., $w_s$, $w_k$), and a graph-based transform kernel may be generated using the correlation coefficient or weight.

For another example, the graph-based transform kernel generated using Equation 6 may be approximated into an integer by multiplying a specific constant and used.

FIG. 26 is an embodiment to which the present invention is applied and shows a flowchart of generating a graph-based transform kernel based on a prediction angle according to an intra prediction mode.

First, the encoder may generate a prediction block for a current block according to an intra prediction mode (S2610), and may generate a residual block using the prediction block (S2620).

The encoder may calculate at least one of a self-loop weight indicating a weight of a boundary pixel within the residual block and a correlation coefficient indicating a correlation between pixels based on a prediction angle corresponding to the intra prediction mode (S2630).

In this case, at least one of the self-loop weight or the correlation coefficient may be determined for each row and each column of the residual block.

Furthermore, the self-loop weight may have a different value according to at least one of the intra prediction mode, the prediction angle, or the position of a reference pixel.

Furthermore, the self-loop weight may be determined based on the distance between the first boundary pixel of each row and each column of the residual block and the reference pixel. For example, since a correlation is reduced as the distance between the first boundary pixel and the reference pixel becomes distant, the self-loop weight may have a small value.

Furthermore, the self-loop weight may be adjusted to have a value within a specific range by an adjustment parameter. In this case, Equation 7 or Equation 12 may be used.

The encoder may generate a graph based on at least one of the self-loop weight or the correlation coefficient (S2640). In this case, the graph may be generated for each row and each column of the residual block.

The encoder may determine or generate a graph-based transform kernel based on the graph (S2650).

The encoder may perform transform on the residual block using the graph-based transform kernel (S2660).

FIG. 27 is an embodiment to which the present invention is applied and shows a flowchart of performing an inverse transform on a graph-based transform kernel generated based on a prediction angle according to an intra prediction mode.

The decoder may extract a residual signal from a video signal (S2710), and may extract a transform index corresponding to the residual signal (S2720).

The decoder may derive a graph-based transform kernel corresponding to the transform index (S2730).

In this case, the graph-based transform kernel may have been determined based on a graph expressed by at least one of a self-loop weight or a correlation coefficient. The at least one of the self-loop weight or the correlation coefficient may have been determined based on a prediction angle corresponding to an intra prediction mode.

Furthermore, the graph-based transform kernel may correspond to each row and each column of the residual signal.

Meanwhile, the self-loop weight may have a different value according to at least one of the intra prediction mode, the prediction angle and the position of a reference pixel.

Furthermore, the self-loop weight may be determined based on the distance between the first boundary pixel of each row and each column of a residual block and the reference pixel. For example, since a correlation is reduced as the distance between the first boundary pixel and the reference pixel becomes distant, the self-loop weight may have a small value.

Furthermore, the self-loop weight may be adjusted to have a value within a specific range by an adjustment parameter. In this case, Equation 7 or Equation 12 may be used.

Furthermore, the decoder may perform inverse transform on the residual signal based on the graph-based transform kernel (S2740).

As described above, the embodiments explained in the present invention may be implemented and performed on a processor, a micro-processor, a controller or a chip. For example, functional modules explained in FIG. 1, FIG. 2, FIG. 8, FIG. 9 and FIG. 10 may be implemented and performed on a computer, a processor, a microprocessor, a controller or a chip.

As described above, the decoder and the encoder to which the present invention is applied may be included in a multimedia broadcasting transmission/reception apparatus, a mobile communication terminal, a home cinema video apparatus, a digital cinema video apparatus, a surveillance camera, a video chatting apparatus, a real-time communication apparatus, such as video communication, a mobile streaming apparatus, a storage medium, a camcorder, a VoD service providing apparatus, an Internet streaming service providing apparatus, a three-dimensional 3D video apparatus, a teleconference video apparatus, and a medical video apparatus and may be used to code video signals and data signals.

Furthermore, the decoding/encoding method to which the present invention is applied may be produced in the form of a program that is to be executed by a computer and may be stored in a computer-readable recording medium.

Multimedia data having a data structure according to the present invention may also be stored in computer-readable recording media. The computer-readable recording media include all types of storage devices in which data readable by a computer system is stored. The computer-readable recording media may include a BD, a USB, ROM, RAM, CD-ROM, a magnetic tape, a floppy disk, and an optical data storage device, for example. Furthermore, the computer-readable recording media includes media implemented in the form of carrier waves, e.g., transmission through the Internet. Furthermore, a bit stream generated by the encoding method may be stored in a computer-readable recording medium or may be transmitted over wired/wireless communication networks.

INDUSTRIAL APPLICABILITY

The exemplary embodiments of the present invention have been disclosed for illustrative purposes, and those skilled in the art may improve, change, replace, or add various other embodiments within the technical spirit and scope of the present invention disclosed in the attached claims.

The invention claimed is:

1. A method of encoding a video signal using a graph-based transform, comprising:
generating a residual block using a prediction block generated according to an intra prediction mode;
obtaining at least one of a self-loop weight indicating a weight of a boundary pixel within the residual block or a correlation coefficient indicating a correlation between pixels, based on a prediction angle corresponding to the intra prediction mode;
generating a graph based on at least one of the self-loop weight or the correlation coefficient;
determining a graph-based transform kernel based on the graph; and
performing a transform for the residual block using the graph-based transform kernel.

2. The method of claim 1, wherein:
at least one of the self-loop weight or the correlation coefficient is determined for each row and each column of the residual block, and
the graph is generated for each row and each column of the residual block.

3. The method of claim 1, wherein the self-loop weight has a different value according to at least one of the intra prediction mode, the prediction angle, or a position of a reference pixel.

4. The method of claim 1, wherein the self-loop weight is determined based on a distance between a first boundary pixel of each row or each column of the residual block and a reference pixel.

5. The method of claim 1, wherein the self-loop weight is adjusted to have a value within a specific range by an adjustment parameter.

6. The method of claim 1, further comprising:
encoding a transform index corresponding to the graph-based transform kernel.

7. A method of decoding a video signal using a graph-based transform, comprising:
extracting a residual signal from the video signal;
extracting a transform index corresponding to the residual signal;
deriving a graph-based transform kernel corresponding to the transform index, wherein the graph-based transform kernel has been determined based on a graph expressed by at least one of a self-loop weight or a correlation coefficient and the at least one of the self-loop weight or the correlation coefficient has been determined based on a prediction angle corresponding to an intra prediction mode; and
performing an inverse transform for the residual signal based on the graph-based transform kernel.

8. The method of claim 7, wherein the graph-based transform kernel corresponds to each row and each column of the residual signal.

9. The method of claim 7, wherein the self-loop weight has a different value according to at least one of the intra prediction mode, the prediction angle, or a position of a reference pixel.

10. The method of claim 7, wherein the self-loop weight has been determined based on a distance between a first boundary pixel of each row or each column of the residual block and a reference pixel.

11. The method of claim 7, wherein the self-loop weight is adjusted to have a value within a specific range by an adjustment parameter.

12. An apparatus for encoding a video signal using a graph-based transform, comprising:
a subtraction unit configured to generate a residual block using a prediction block generated according to an intra prediction mode;
a graph generation unit configured to obtain at least one of a self-loop weight indicating a weight of a boundary pixel within the residual block or a correlation coefficient indicating a correlation between pixels, based on a prediction angle corresponding to the intra prediction mode and generate a graph based on at least one of the self-loop weight or the correlation coefficient;

a transform matrix determination unit configured to determine a graph-based transform kernel based on the graph; and a transform execution unit configured to perform a transform for the residual block using the graph-based transform kernel.

13. The apparatus of claim 12, wherein the self-loop weight has a different value according to at least one of the intra prediction mode, the prediction angle, or a position of a reference pixel.

14. An apparatus for decoding a video signal using a graph-based transform, comprising:

a parsing unit configured to extract a residual signal from the video signal and extracting a transform index corresponding to the residual signal; and an inverse transform unit configured to derive a graph-based transform kernel corresponding to the transform index and perform an inverse transform on the residual signal based on the graph-based transform kernel, wherein the graph-based transform kernel has been determined based on a graph expressed by at least one of a self-loop weight or a correlation coefficient, and wherein the at least one of the self-loop weight or the correlation coefficient has been determined based on a prediction angle corresponding to an intra prediction mode.

* * * * *